United States Patent [19]
Hirayama et al.

[11] Patent Number: 5,808,449
[45] Date of Patent: Sep. 15, 1998

[54] METHOD AND APPARATUS FOR DETECTING ISLANDING OPERATION OF DISPERSED GENERATOR

[75] Inventors: Yoshiyuki Hirayama, Ohara; Nobuhiro Kuroda, Yokohama; Takaaki Kai; Toshiaki Fujimoto, both of Omiya; Haruo Sasaki, Tokorozawa; Yasutomo Imai, Yono; Jun Motohashi, Kawasaki; Hirotoshi Kaneda, Machida, all of Japan

[73] Assignees: Kabushiki Kaisha Meidensha; The Tokyo Electric Power Company, both of Tokyo, Japan

[21] Appl. No.: 655,817

[22] Filed: May 31, 1996

[30] Foreign Application Priority Data

Feb. 6, 1995 [JP] Japan .................................... 8-019572
May 31, 1995 [JP] Japan .................................... 7-133000

[51] Int. Cl.⁶ .......................................................... H02P 9/10
[52] U.S. Cl. .................................. 322/20; 322/58; 307/73
[58] Field of Search ................................. 322/29, 28, 20; 307/73; 290/4 A; 324/616

[56] References Cited

U.S. PATENT DOCUMENTS

| | | | |
|---|---|---|---|
| 4,311,253 | 1/1982 | Putman et al. | 322/25 |
| 4,509,585 | 4/1985 | Carney et al. | 165/12 |
| 4,521,692 | 6/1985 | Genuit et al. | 290/4 A |
| 4,897,593 | 1/1990 | Konishi et al. | 323/210 |
| 5,111,377 | 5/1992 | Higasa et al. | 363/95 |
| 5,327,336 | 7/1994 | Ohkubo et al. | 363/97 |
| 5,422,518 | 6/1995 | Sashida | 307/75 |
| 5,594,350 | 1/1997 | Koizumi et al. | 324/616 |
| 5,604,420 | 2/1997 | Nambu | 322/19 |

FOREIGN PATENT DOCUMENTS

| | | |
|---|---|---|
| 0 432 269 | 10/1990 | European Pat. Off. . |
| 0 612 133 | 2/1994 | European Pat. Off. . |
| 7-31197 | 1/1995 | Japan . |

OTHER PUBLICATIONS

Patent Abstracts of Japan, Pub. No. 07 031197, vol. 95, No. 4, May 31, 1995.
Patent Abstracts of Japan, Pub. No. 07 067321, vol. 95, No. 6, Jul. 31, 1995.
Patent Abstracts of Japan, Pub. No. 06 311652, vol. 95, No. 2, Mar. 31, 1995.

Primary Examiner—Steven L. Stephan
Assistant Examiner—Nicholas Ponomarenko
Attorney, Agent, or Firm—Foley & Lardner

[57] ABSTRACT

A method for detecting islanding operation of a rotating-machine type dispersed generator. The dispersed generator is interconnected with a main electric source through a circuit breaker to constitute an electric power system. The estimating method is implemented as follows: (a) changing electric power of the electric power system; (b) detecting frequency component of the electric power; and (c) deciding that an islanding operation of the dispersed generator is executed if the change of the frequency component becomes greater than a predetermined value. With this method, it becomes possible to detect the islanding operation of the dispersed generator even if the power flow at the interconnecting circuit breaker is generally zero.

18 Claims, 27 Drawing Sheets

FREQUENCY OF VOLTAGE
SET VALUE DEVIATION
[Hz]

GENERATOR EFFECTIVE POWER [PU]

5,808,449

METHOD AND APPARATUS FOR DETECTING ISLANDING OPERATION OF DISPERSED GENERATOR

BACKGROUND OF THE INVENTION

Field of the Invention

The present invention relates to a method and apparatus for detecting an islanding operation of a rotating machine type electric source interconnected with an electric power system.

From the viewpoint of energy saving and effective utilization of unused energy, rotating machine type dispersed generators have been rapidly come into use. Normally, such rotating machine type dispersed generators are operated upon being interconnected with an electric power system of an electric power company. FIG. 41 shows a typical model where a rotating machine type dispersed generator 102 is connected to a commercial electric source 101 of an electric power company through an interconnecting circuit breaker 103 and a consumer circuit breaker 104. A load 105 is disposed between the interconnecting circuit breaker 103 and the consumer circuit breaker 104. When the power flow including effective power and reactive power is flowing through the interconnecting circuit breaker 103, if the interconnecting circuit breaker 103 is opened, the rotating machine type dispersed generator 102 generates unbalance between the effective power and the reactive power, and therefore the frequency or phase of the voltage from the dispersed generator 102 is changed. Accordingly, it is possible to detect an islanding operation of the dispersed generator in such power flow condition.

However, if the islanding operation is started in case that the power flow at the interconnecting circuit breaker is generally zero, it is difficult to detect the islanding operation by conventional methods for detecting the change of the frequency or phase of the voltage from the dispersed generator.

SUMMARY OF THE INVENTION

It is an object of the present invention to provide a method and apparatus for detecting an islanding operation of a rotating machine type distribution electric source connected with an electric power system through a circuit breaker even when power flow at the circuit breaker is about zero.

An aspect of the present invention resides in a method for detecting islanding operation of a rotating-machine type dispersed generator. The dispersed generator and a main electric source constitute an electric power system, the method comprising the steps of: changing electric power of the electric power system; detecting frequency component of the electric power; and deciding that an islanding operation of the dispersed generator is executed if the change of the frequency component becomes greater than a predetermined value.

Another aspect of the present invention resides in a method for detecting islanding operation of a rotating-machine type dispersed generator. The dispersed generator is interconnected with a main electric source through a circuit breaker to constitute an electric power system. The method comprising the steps of: calculating a frequency deviation and a period of electric power of the electric power system from an output and a machine constant of the dispersed generator, a transfer function of an automatic voltage regulator of the dispersed generator, a transfer function of a governor of the dispersed generator; outputting an islanding operation signal indicating that the dispersed generator is executing the islanding operation from a frequency relay section when the calculated deviation becomes greater than a settling value; inputting a disturbance signal from a disturbance signal generating section to the automatic voltage regulator when the frequency deviation, the period and the islanding operation signal are obtained; and deviating the voltage set value by predetermined period cycle by outputting the voltage set value deviating signal from said disturbance signal generating section to the automatic voltage regulator.

A further aspect of the present invention is resides in an apparatus for detecting islanding operation of a rotating-machine type dispersed generator. The dispersed generator and a main electric source constituting an electric power system. The apparatus comprises a means for changing electric power of the electric power system, a means for detecting frequency component of the electric power and a means for deciding that an islanding operation of the dispersed generator is executed if the change of the frequency component becomes greater than a predetermined value.

Another aspect of the present invention resides in an apparatus for detecting islanding operation of a rotating-machine type dispersed generator. The dispersed generator is interconnected with a main electric source through a circuit breaker to constitute an electric power system. The apparatus comprises a means for calculating a frequency deviation and a period of electric power of the electric power system from an output and a machine constant of the dispersed generator, a transfer function of an automatic voltage regulator of the dispersed generator, a transfer function of a governor of the dispersed generator; a means for outputting an islanding operation signal indicating that the dispersed generator is executing the islanding operation from a frequency relay section when the calculated deviation becomes greater than a settling value; a means for inputting a disturbance signal from a disturbance signal generating section to the automatic voltage regulator when the frequency deviation, the period and the islanding operation signal are obtained; and a means for deviating the voltage set value by predetermined period cycle by outputting the voltage set value deviating signal from the disturbance signal generating section to the automatic voltage regulator.

BRIEF DESCRIPTION OF THE DRAWINGS

In the drawings, like reference numeral designate like parts and elements throughout all figures, in which.

DETAILED DESCRIPTION OF THE INVENTION

Referring to FIGS. 1 to 23, there is shown a first embodiment of an islanding operation detecting system for a dispersed generator of a rotation machine type in accordance with the present invention.

Figure 1:
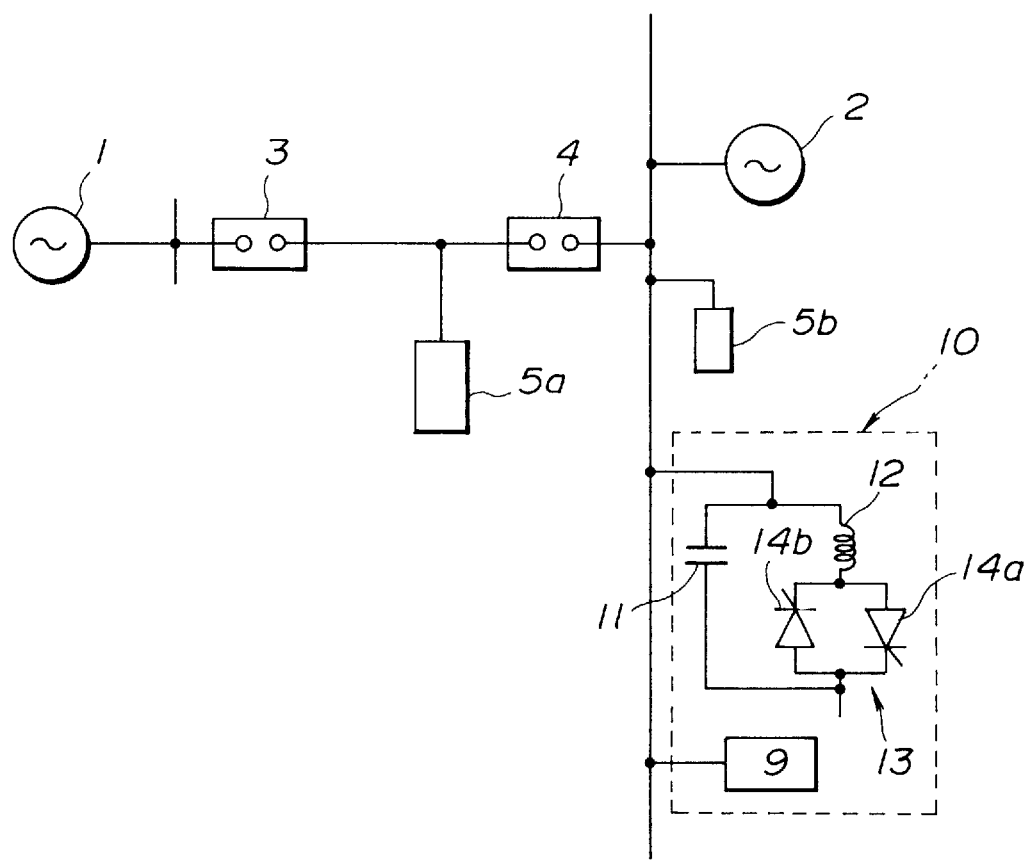
FIG. 1 is a circuit diagram which shows a first embodiment of a method and system of detecting an islanding operation of a dispersed generator according to the present invention.
Figure 2:
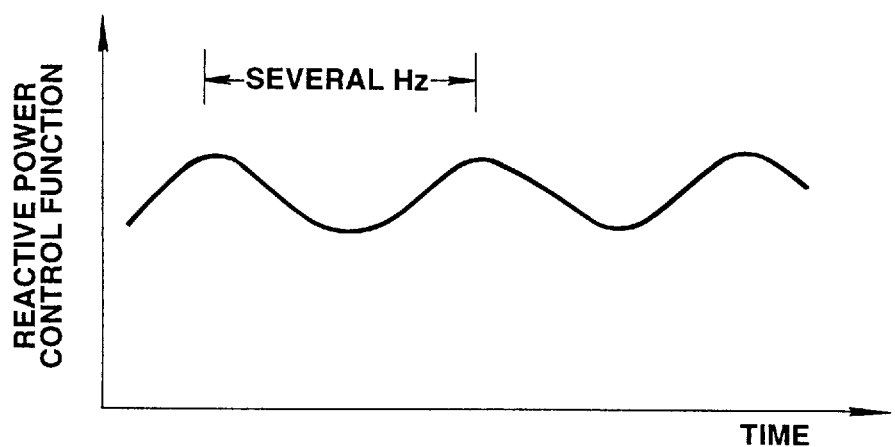
FIG. 2 is a graph which shows a waveform of a reactive power changed by a reactive power control function in a system interconnected condition.
Figure 3:
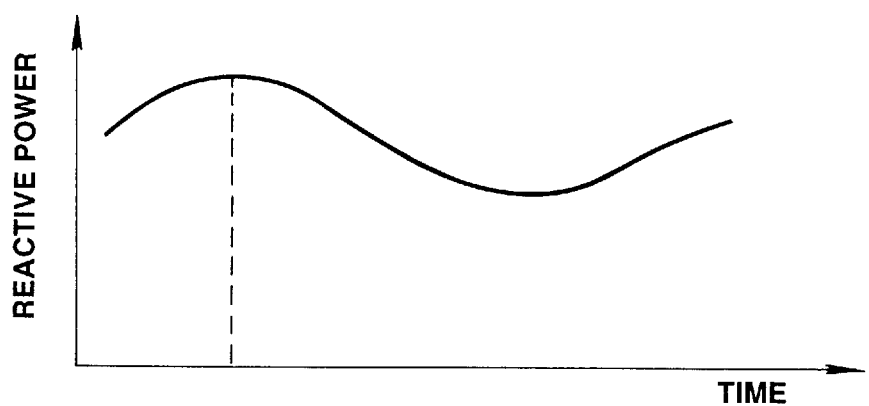
FIG. 3 is a graph which shows a waveform of the reactive power changed by the reactive power control function in an interconnecting circuit breaker open-condition.
Figure 4:
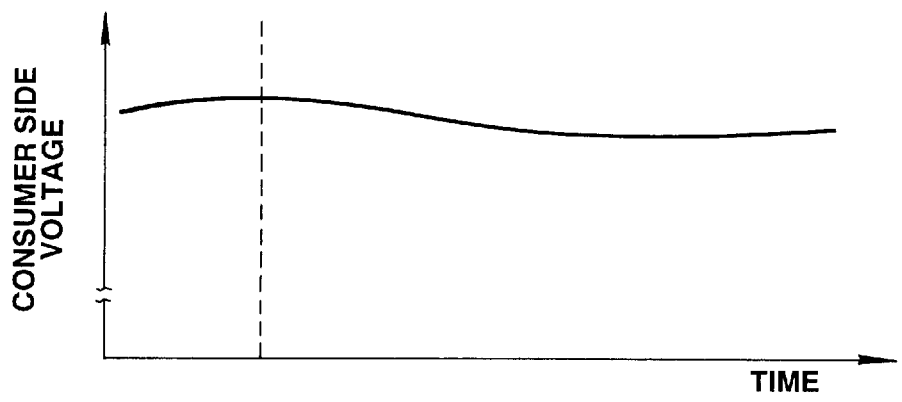
FIG. 4 is a graph which shows a waveform of a consumer side voltage due to the reactive power control function in the interconnecting circuit breaker open-condition.

As shown in FIG. 1, an electric power system is constituted by a commercial electric source 1 and a dispersed generator (generator) 2 which are arranged to supply electric power to loads 5a and 5b. The dispersed generator 2 is connected with the commercial electric source 1 through an interconnecting circuit breaker 3 and a power-receiving circuit breaker 4. The islanding operation detecting section 10 is directly connected with the dispersed generator 2 and connected with the commercial electric source 1 through the circuit breakers 3 and 4. The islanding operation detecting section 10 comprises a capacitor 11 which is connected parallel with a series connection of a coil 12 and a bi-directional conducting switch 13. The bi-directional conducting switch 13 is constituted by a pair of thyristors 14a and 14b which are in reverse and parallel connection. In the electric power system, the islanding operation detecting section 10 detects an islanding operation of the dispersed generator 2 and executes a necessary sequence process including a cutoff of the power-receiving circuit breaker 4. When the system is in an interconnected condition that the commercial electric source 1 and the dispersed generator 2 are connected to the load, reactive power consumed by the rotation-machine type dispersed generator 2 is changed due to the reactive power control function of the islanding operation detecting section 10, as shown in FIG. 3 while the change of the frequency of the reactive power is not occurred. Further, as shown in FIG. 4, the deviation of the voltage of the consumer is minimized.

Figure 5:
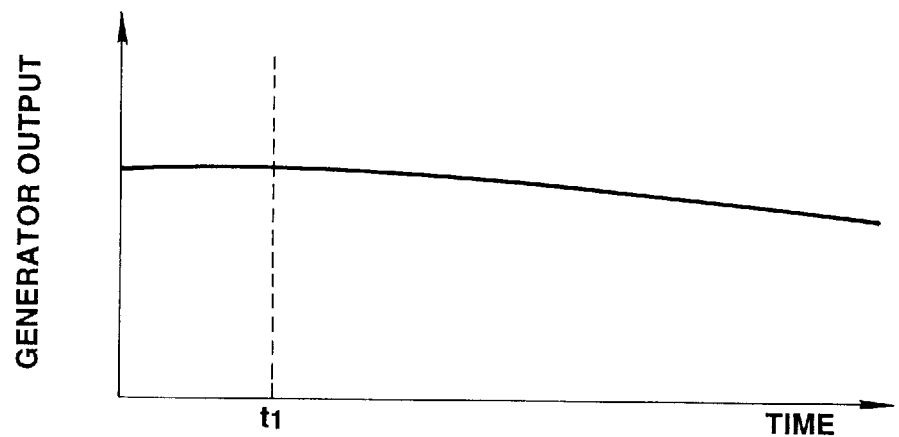
FIG. 5 is a wave form graph which shows a change of the consumption of the effective power at a load.
Figure 6:
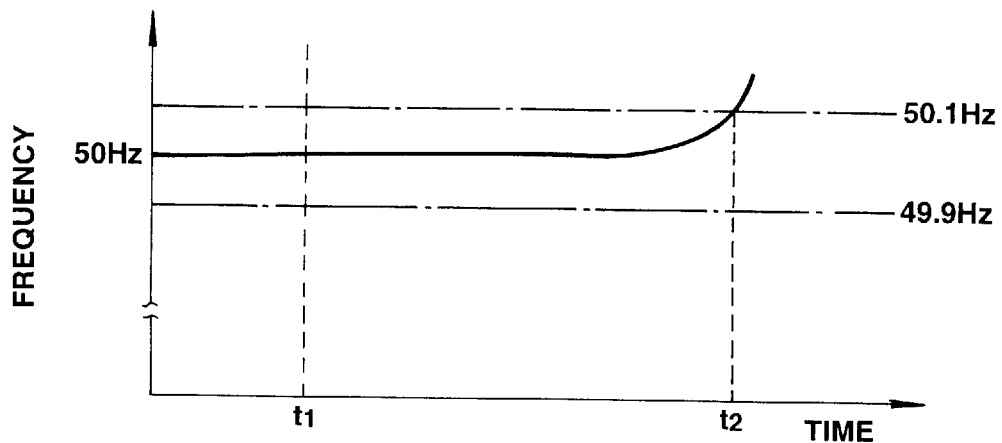
FIG. 6 is a graph which shows a change of the frequency due to the islanding operation in the interconnecting circuit breaker open-condition.

When the interconnecting circuit breaker 3 is opened in a condition that a power flow at the interconnecting circuit breaker 3 is zero, the reactive power of the consumer is changed as shown in FIG. 3 due to the reactive power control function. Therefore, the voltage of the consumer is lowered as shown in FIG. 5. In this case, since the generator 2 is accelerated, the frequency of the electric power is raised up as shown in FIG. 6, the islanding operation detecting section 10 can detect the islanding operation by means of the frequency relay 9.

Figure 7:
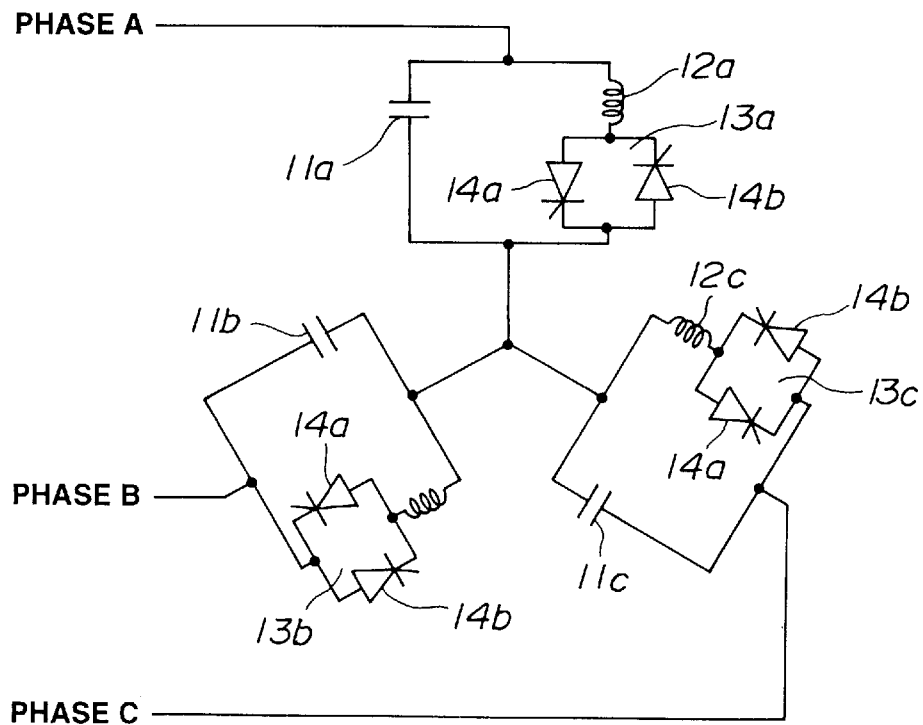
FIG. 7 is a circuit diagram which shows a reactive power control circuit.

FIG. 7 shows a circuit for performing a reactive power control function. Numerals 11a, 11b and 11c are capacitors corresponding to phase A, phase B and phase C, respectively. Numerals 12a, 12b and 12c are coils for the respective phase A, phase B and phase C. Numerals 13a, 13b and 13c are bi-directional conducting switches for the respective phase A, phase B and phase C.

Figure 8:
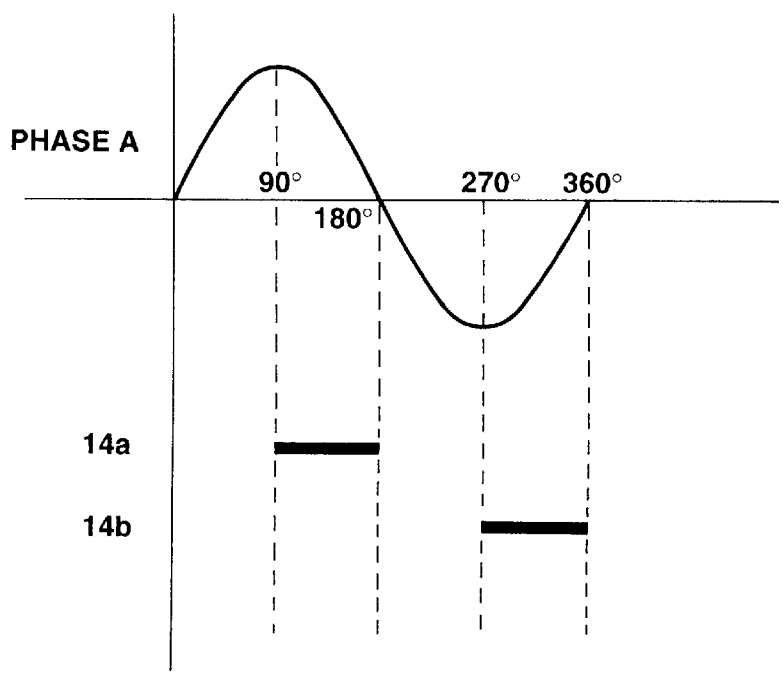
FIG. 8 is a view for explaining an ignition pulse control method by thyristors of FIG. 7.

FIG. 8 shows a method for controlling the reactive power with respect to phase A. The thyristor 14a of FIG. 7 controls the ignition pulse with respect to the phase voltage Va within a range 90°–180°, and the thyristor 14b controls ignition pulse with respect to the phase voltage Va within a range 270°–360°.

With the thus arranged islanding operation detecting system, even in case that the interconnecting circuit breaker is cutoff when the power flow is zero, the islanding operation of the dispersed generator 2 can be detected from the change of the frequency.

As to such detection, a digital simulation was carried out as shown in FIGS. 9 to 23.

[Simulation Condition]

Figure 9:
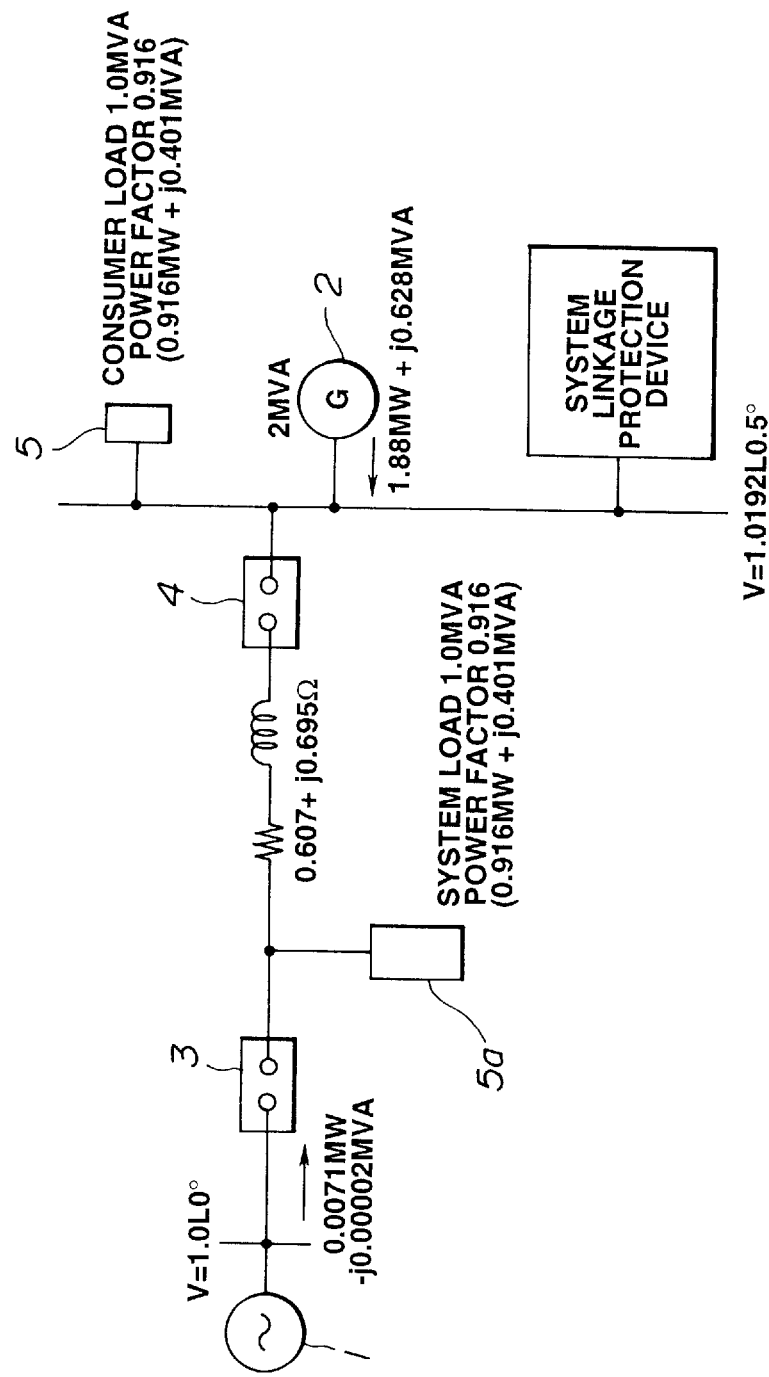
FIG. 9 is a circuit diagram of an electric power system of a simulation according to the present invention.

The power flow at the interconnecting circuit breaker 3 in the system shown in FIG. 9 was set at about zero by setting the effective and reactive power at 0.0071 MW–j0.00002 MVA, the rated output of the generator 2 was 2 MVA, and the effective and reactive power during the simulation was set at 1.88 MW+j0.628 MVA. The equipment constants (specification) was set as shown in Table 1.

TABLE 1

| armature resistance | Ra [PU] | 0.0185 |
| --- | --- | --- |
| armature leakage reactance | X1 [PU] | 0.104 |
| d-axis synchronous reactance | Xd [PU] | 1.90 |
| q-axis synchronous reactance | Xq [PU] | 0.99 |
| d-axis transient reactance | Xd' [PU] | 0.265 |
| q-axis transient reactance | Xq' [PU] | 0.88 |
| d-axis subtransient reactance | Xd" [PU] | 0.172 |
| q-axis subtransient reactance | Xq" [PU] | 0.192 |
| d-axis open-circuit transient time-constant | Td0'[sec.] | 2.64 |
| q-axis open-circuit transient time-constant | Tq0'[sec.] | 0.133 |
| d-axis open-circuit subtransient time-constant | Td0"[sec.] | 0.033 |
| q-axis open-circuit subtransient time-constant | Tq0"[sec.] | 0.104 |
| zero-phase resistance | Rn [Ω] | 0.036 |
| zero-phase reactance | Xn [Ω] | 4.14 |
| moment of inertia | M [sec.] | 2.36 | wherein the moment M of inertia includes a generator, a prime mover and a reducer, and this simulation was executed by using a salient pole machine.

Figure 10:
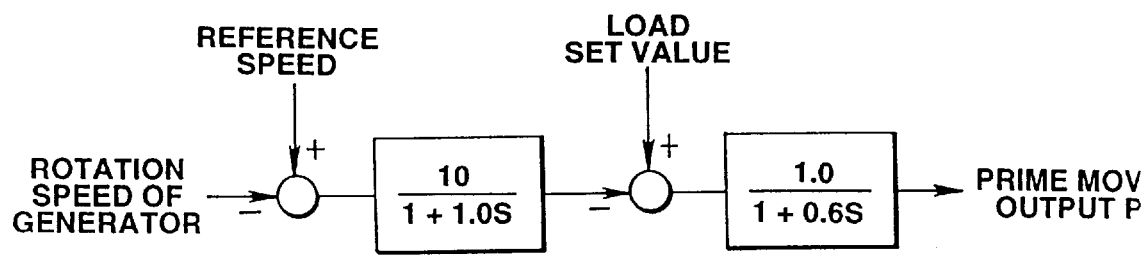
FIG. 10 is a block diagram which shows a control-circuit constant of a governor applied to the system of FIG. 9.
Figure 11:
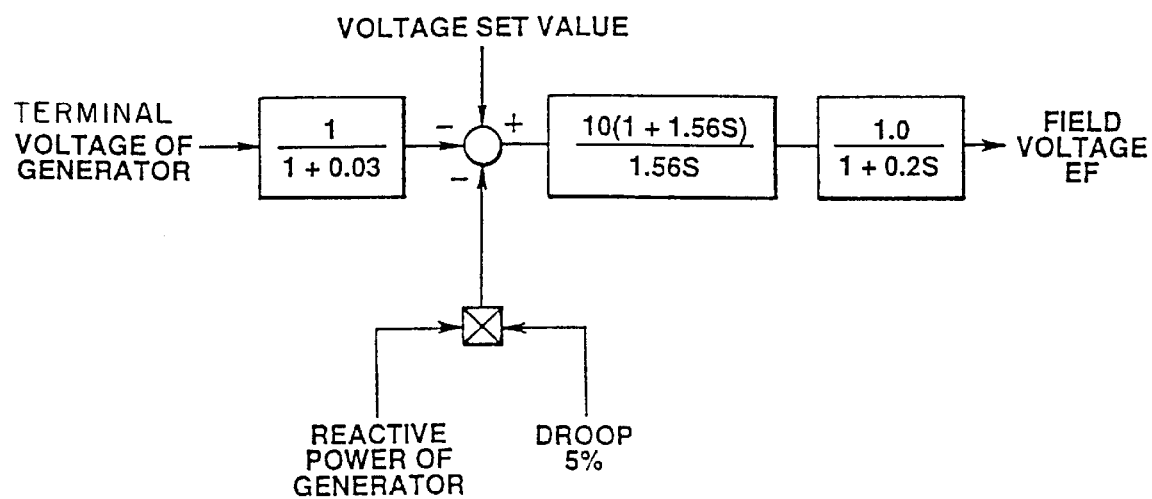
FIG. 11 is a block diagram which shows a circuit constant of an automatic voltage regulator applied to the system of FIG. 9.
Figure 12:
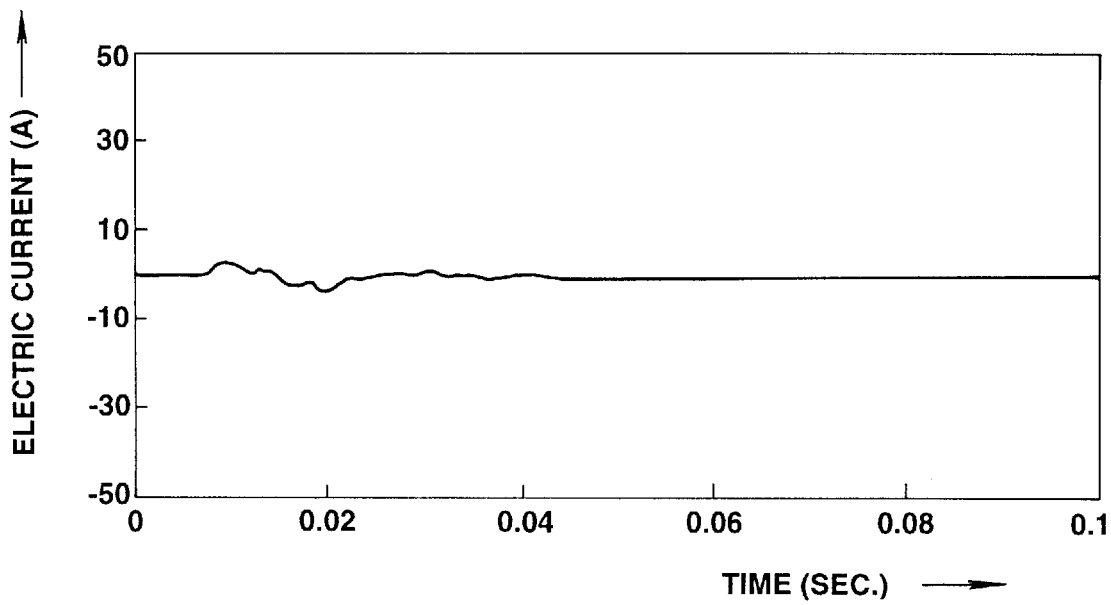
FIG. 12 is a graph which shows a characteristic of the electric current at an interconnecting point obtained by the simulation according to the present invention.
Figure 13:
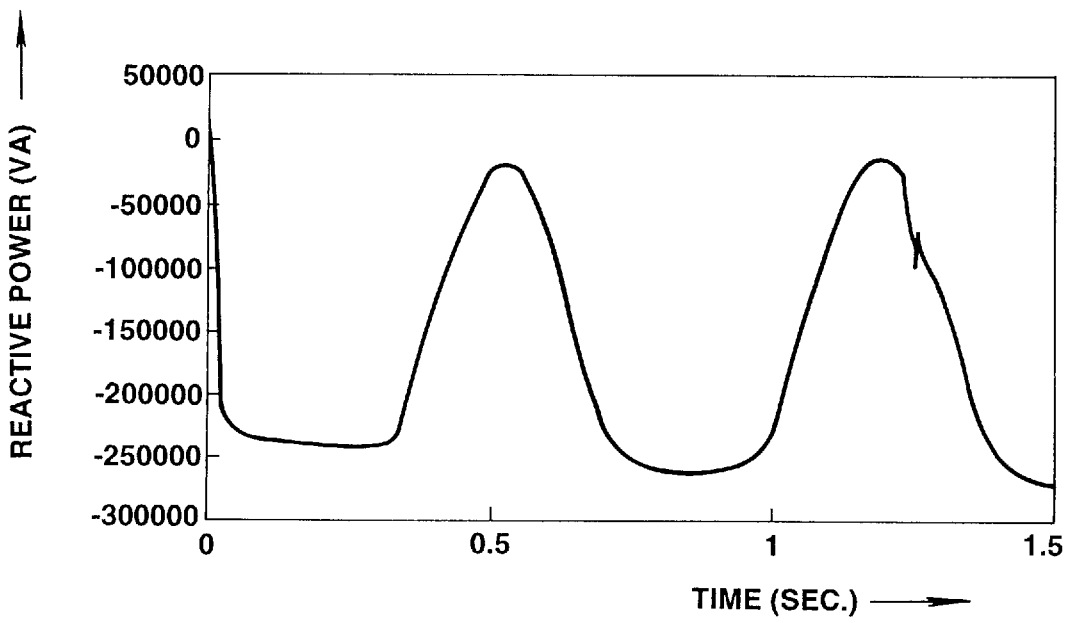
FIG. 13 is a graph which shows a characteristic of the reactive power control obtained by the simulation according to the present invention.
Figure 14:
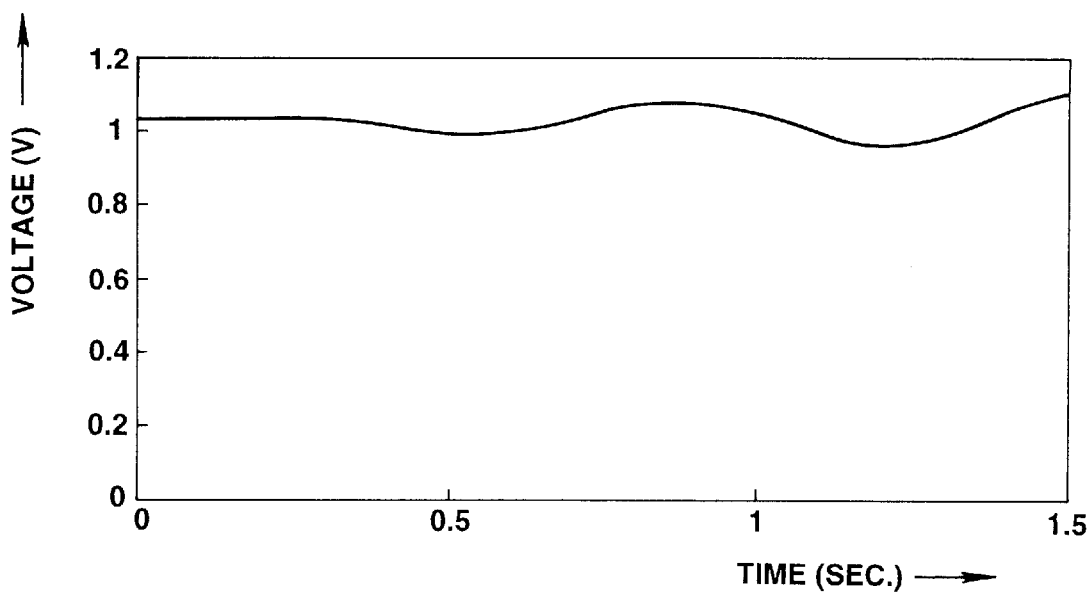
FIG. 14 is a graph which shows a characteristic of the voltage at a receiving terminal, obtained by the simulation according to the present invention.

A control circuit constant of a governor was set as shown in FIG. 10, and that of the automatic voltage regulator (AVR) was set as shown in FIG. 11. The reactive power control function was executed by using the circuit shown in FIG. 7. The thyristor 14a of FIG. 7 is arranged to control the ignition pulse with respect to the phase voltage Va within a range 90°–180°, and the thyristor 14b is arranged to control ignition pulse with respect to the phase voltage Va within a range 270°–360°. The reactive power control shown in FIGS. 12 to 23 was executed in a condition that the ignition pulse was controlled with respect to the maximum capacity 250 KVA at 1.5 Hz period.

[Result of the simulation]

FIGS. 12 to 15 show the electric current of phase A of the interconnecting circuit breaker 3, the control amount of the reactive power, the receiving end voltage (consumer end voltage) and the receiving end frequency, respectively, in case that the power flow at the interconnecting circuit breaker 3 is 1[A] and the interconnecting circuit breaker 3 is cutoff at t=0.04 second.

Figure 15:
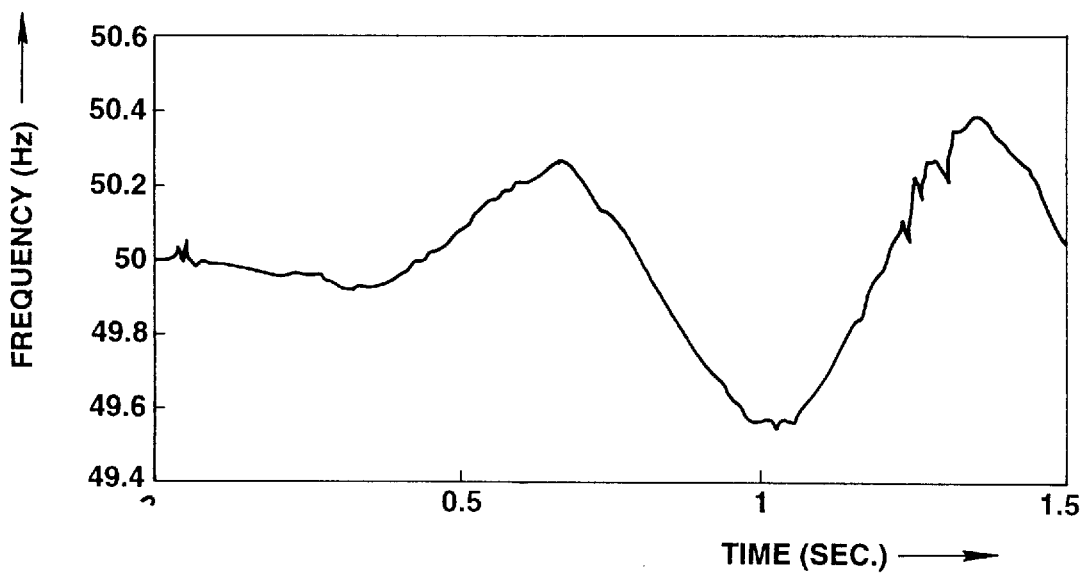
FIG. 15 is a graph which shows a characteristic of the frequency at a receiving terminal, obtained by the simulation according to the present invention.
Figure 16:
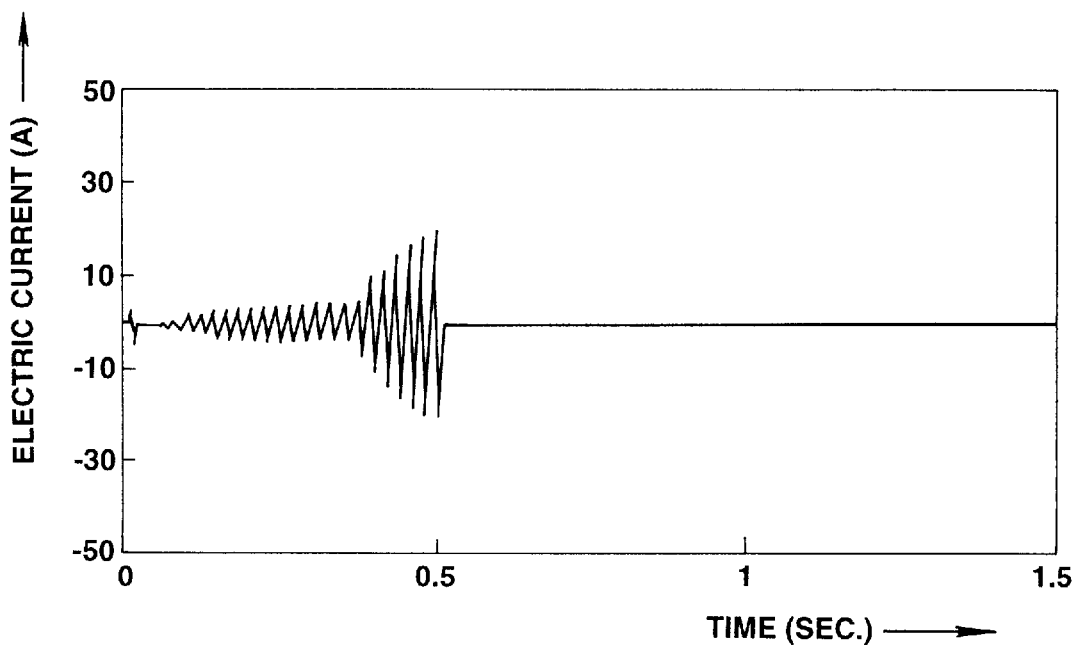
FIG. 16 is a graph which shows a characteristic of the electric current at the interconnecting point, obtained by the simulation according to the present invention.
Figure 17:
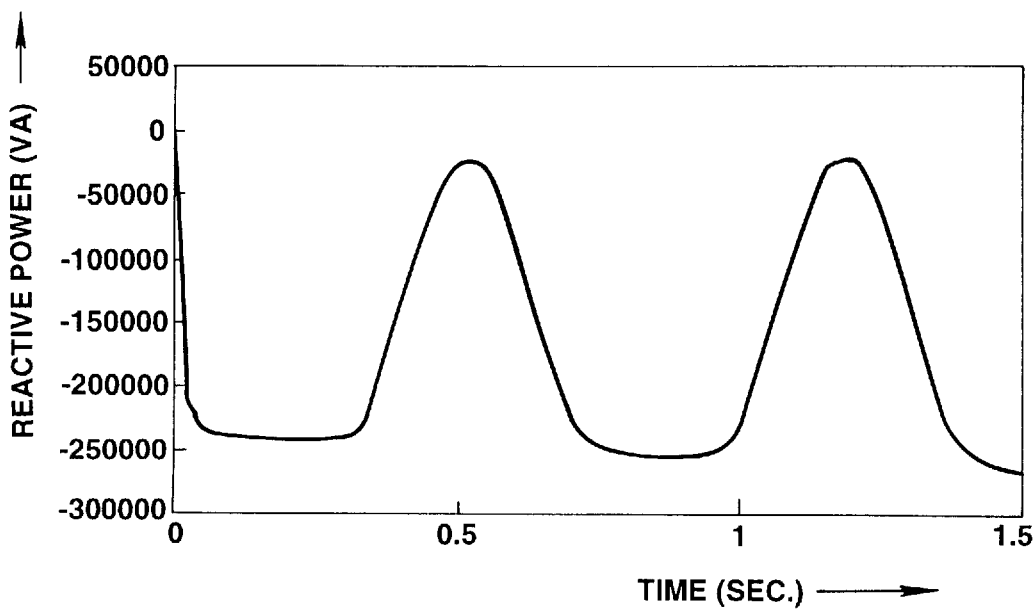
FIG. 17 is a graph which shows a characteristic of the reactive power control obtained by the simulation according to the present invention.
Figure 18:
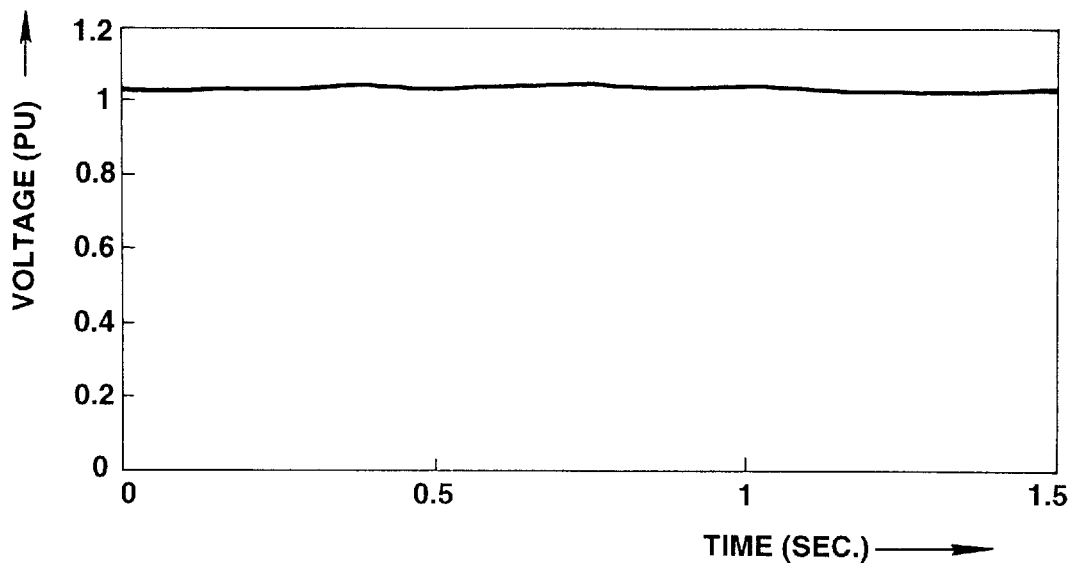
FIG. 18 is a graph which shows a characteristic of the voltage at a receiving terminal, obtained by the simulation according to the present invention.
Figure 19:
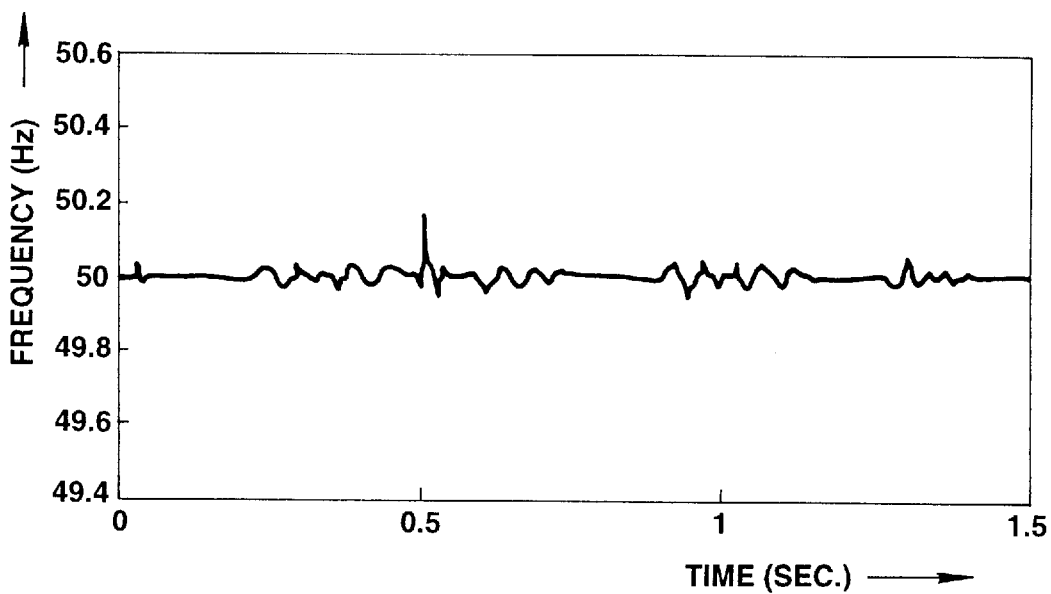
FIG. 19 is a graph which shows a characteristic of the frequency at a receiving terminal, obtained by the simulation according to the present invention.
Figure 20:
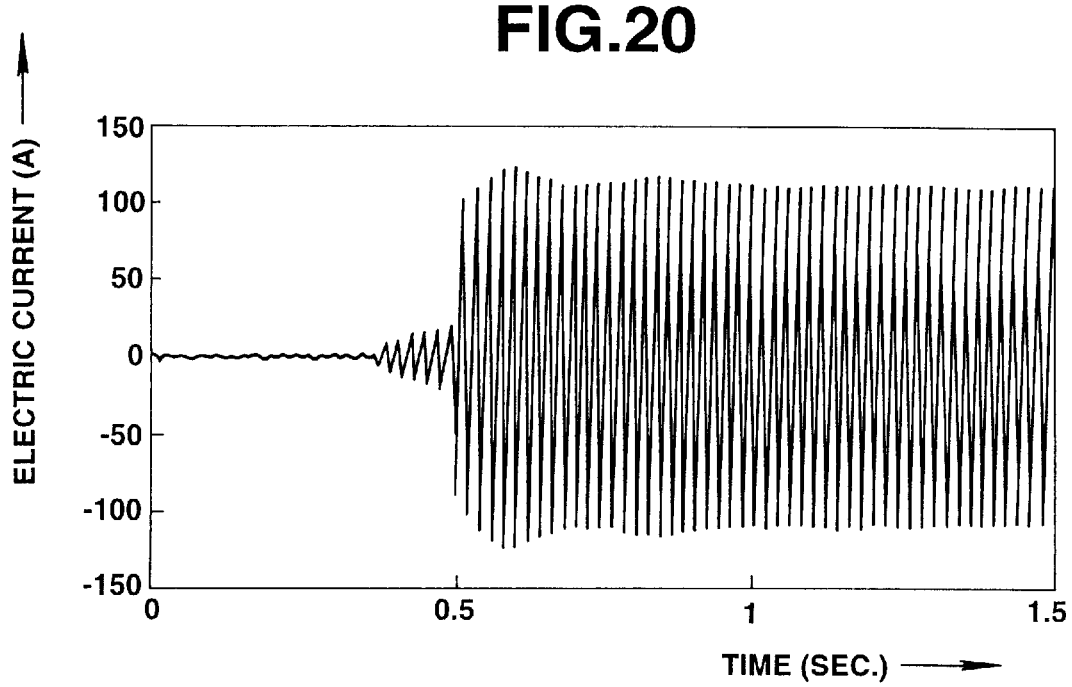
FIG. 20 is a graph which shows a characteristic of the electric current at the interconnecting point, obtained by the simulation according to the present invention.
Figure 21:
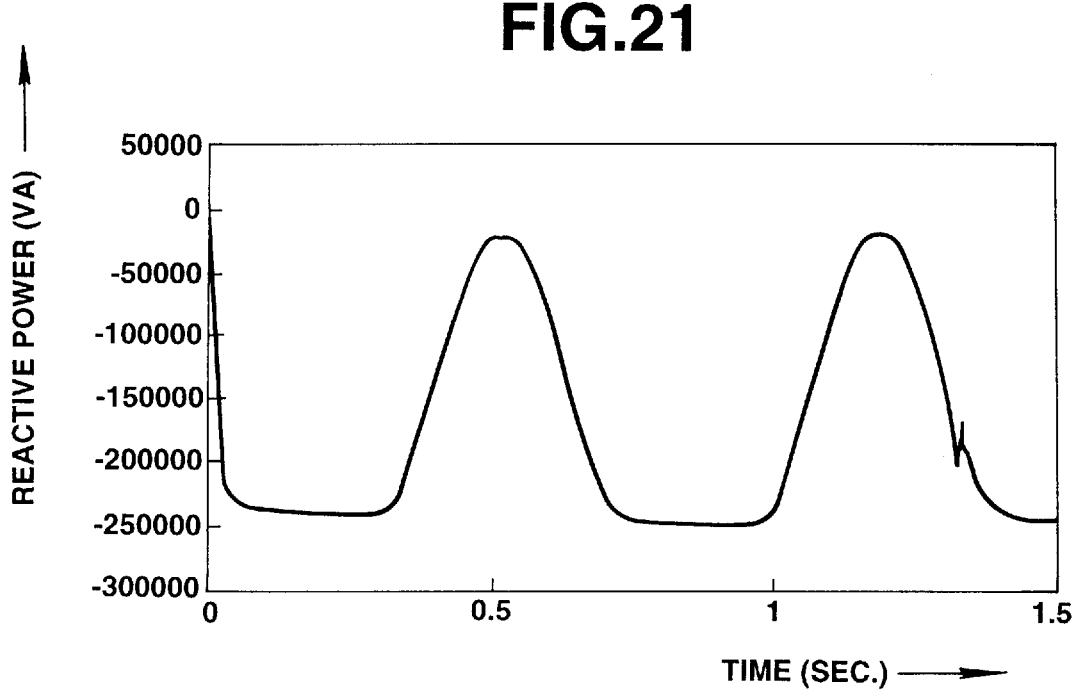
FIG. 21 is a graph which shows a characteristic of the reactive power control obtained by the simulation according to the present invention.
Figure 22:
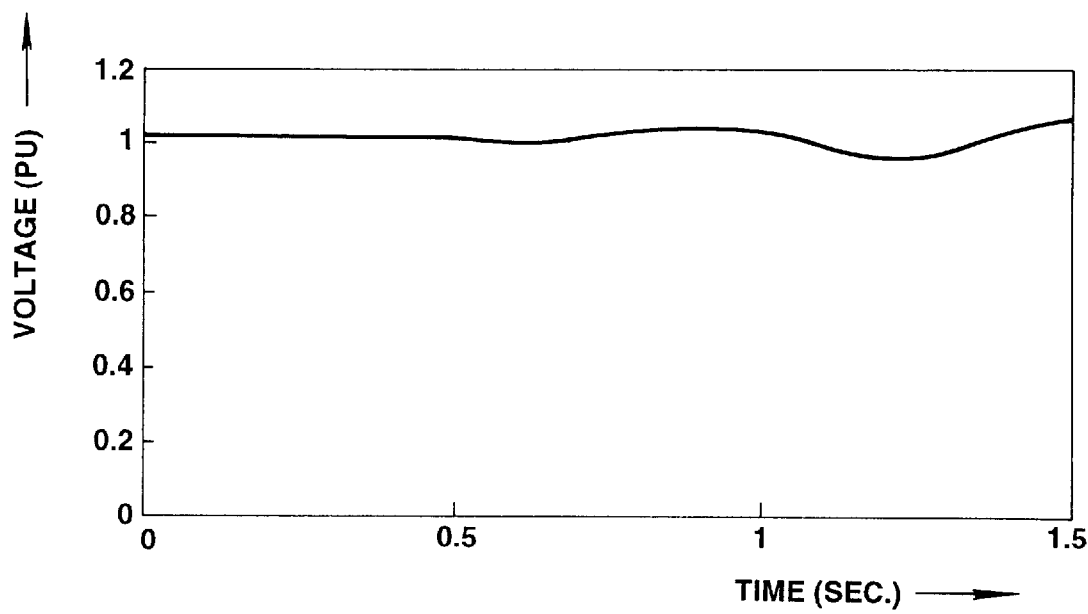
FIG. 22 is a graph which shows a characteristic of the voltage at a receiving terminal, obtained by the simulation according to the present invention.

As shown in FIG. 15, the frequency was changed to form a peak +0.2 Hz at 0.7 second after the cutoff of the interconnecting circuit breaker 3, and then the deviation of the frequency was –0.4 Hz at 1.0 second and +0.38 Hz at 1.4 second.

Normally, in case of the detection of the individual operating condition, it is desired that the set value of the change amount of the frequency is 0.1 Hz and the detection time is within 1.0 second. Therefore, according to the present invention, this desired condition for the detection is sufficiently satisfied.

FIGS. 16 to 19 show the electric current the phase A of the interconnecting circuit breaker 3, the control amount of the reactive power, the receiving end voltage (consumer end voltage) and the receiving end frequency in case that the power flow of the interconnecting circuit breaker is 10[A], and the interconnecting circuit breaker 3 is cutoff in t=0.5 second. As is clear from FIG. 19, it is possible to detect the islanding operation in a manner similar to that in FIGS. 12 to 15.

Figure 23:
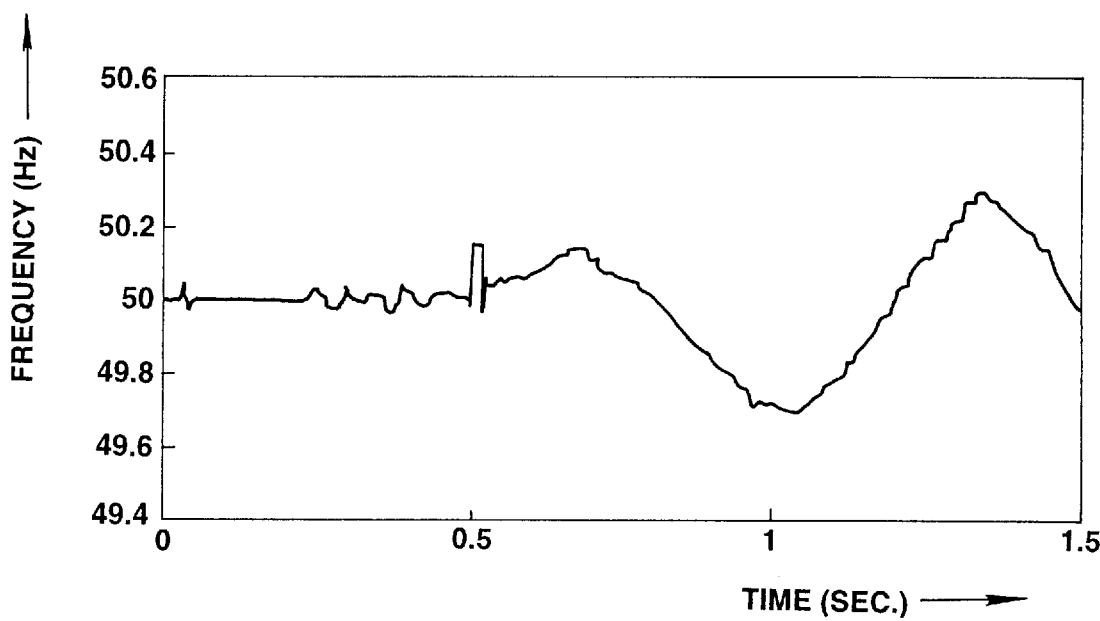
FIG. 23 is a graph which shows a characteristic of the frequency at a receiving terminal, obtained by the simulation according to the present invention.

FIGS. 20 to 23 show the phase A electric current of the interconnecting circuit breaker 3, the control amount of the reactive power, the receiving end voltage (consumer end voltage), and the receiving end frequency in case that the load of the consumer is cutoff in the interconnected condition. This simulation of FIGS. 20 to 23 was executed to confirm whether the detection of the individual operating condition is executed by the frequency change due to the unbalance of the input and output of the generator created by the load dc of the consumer in the interconnected condition. Just after the cutoff of load (t=0.5 second) shown in FIG. 20, the detection of the frequency change was executed through a timer of 100–200 milliseconds. Therefore, a wrong detection is not executed as shown in FIG. 23.

With the above described method and apparatus for detecting the islanding operation according to the present invention, since the detection of the islanding operation of the dispersed generator is detected as to whether the change of the frequency component becomes greater than a predetermined value, it is possible to ensure high-quality electric power, high-reliability in electric power supply, and preferable maintenance ability.

Referring to FIGS. 24 to 29, there is shown a second embodiment of the islanding operation detecting system according to the present invention.

Figure 24:
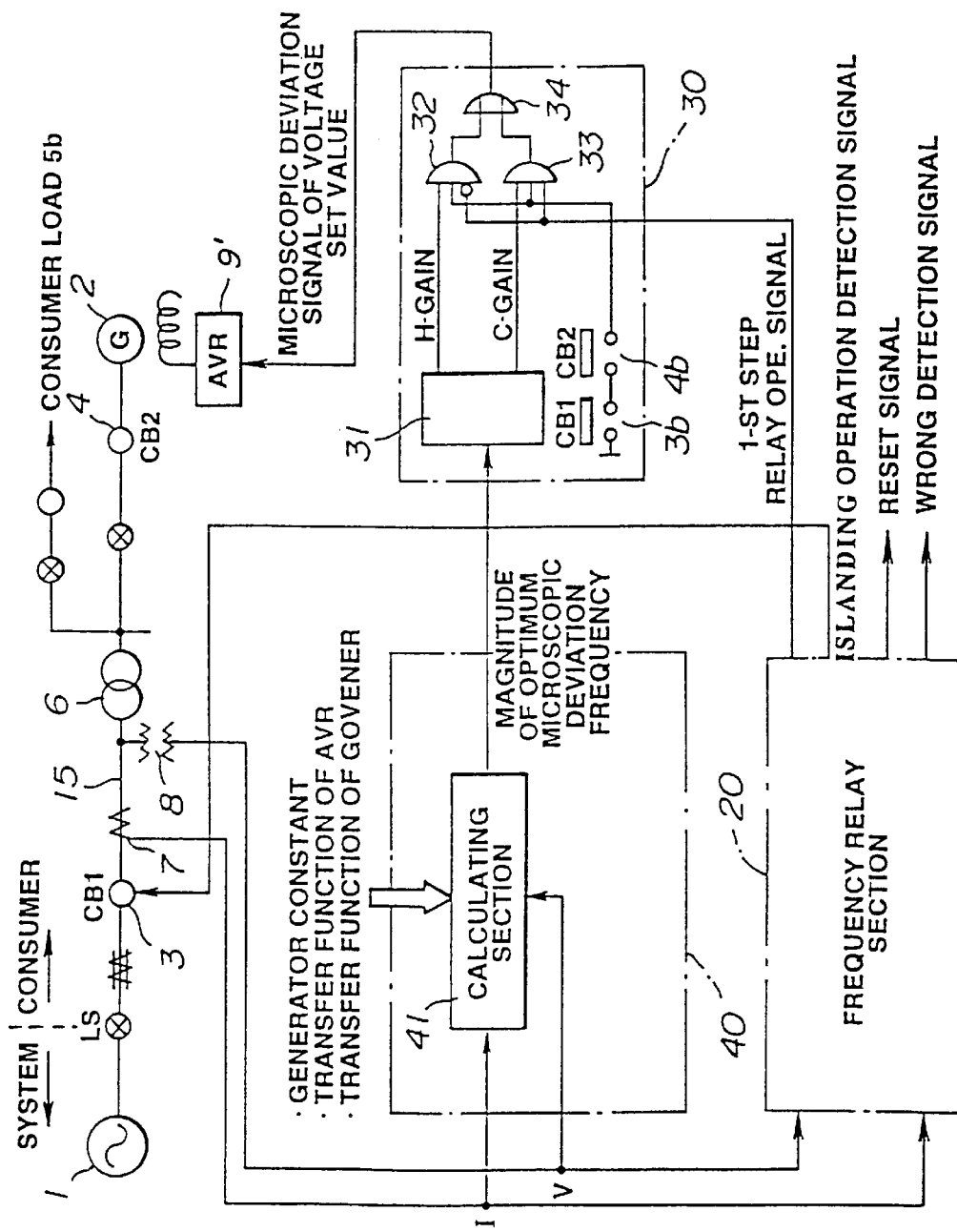
FIG. 24 is a circuit diagram which shows a second embodiment of a method and system of detecting an islanding operation of a dispersed generator according to the present invention.

As shown in FIG. 24, a commercial electric source 1 is connected to a load 5b of a consumer through a distributed wire 15 where the interconnecting circuit breaker 3, a current transformer 7, a transformer 6, a current transformer 7 and a consumer circuit breaker 4 are disposed. A meter transformer 8 is connected to the distribution wire 15 between the current transformer 7 and the transformer 6 so as to supply a voltage signal V as input to a calculation control section 40 and a frequency relay section 20. An electric current signal I indicative of the electric current flowing through the distribution wire 15 is supplied from the current transformer 7 to the calculation control section 40 and the frequency relay section 20. A synchronous generator 2 functioning as a dispersed generator is connected to the consumer load 5b through a circuit breaker 4. An automatic voltage regulator (AVR) 9' is installed to the synchronous generator 2.

The calculation control section 40 comprises a calculating section 41 which receives the electric current detection signal I and the voltage signal V as input. The calculating section 41 calculates an optimum small-deviation of the frequency and its magnitude on the basis of the signals I and V, a generator constant, an automatic voltage regulator transfer function and a speed controller transfer function.

The frequency relay section 20 is arranged to receive the electric current detection signal I and the voltage signal V and to output a first-step relay operation signal, an islanding operation detection signal of the generator 2, a reset signal and an abnormal detection signal. The details of the frequency relay section will be discussed later with reference to FIG. 25.

A disturbance signal generating section 30 comprises a disturbance signal generator 31 which generates a disturbance signal upon receiving the optimum small deviation frequency signal of a calculation output signal of the calculating section 41 as an input, a NAND gate 32 which receives the low-gain output signal of the disturbance generator 31, the first-step relay operation signal of the frequency relay section 20 and contact signals of the auxiliary contacts 3b and 4b of the circuit breakers 3 and 4 as input, an AND gate 33 which receives the high-gain output signal of the disturbance generator 31, the first-step relay operation signal and the contact signals as input and an OR gate 34 which receives the output signal of the NAND gate 32 and the output signal of the AND gate 33.

Figure 25:
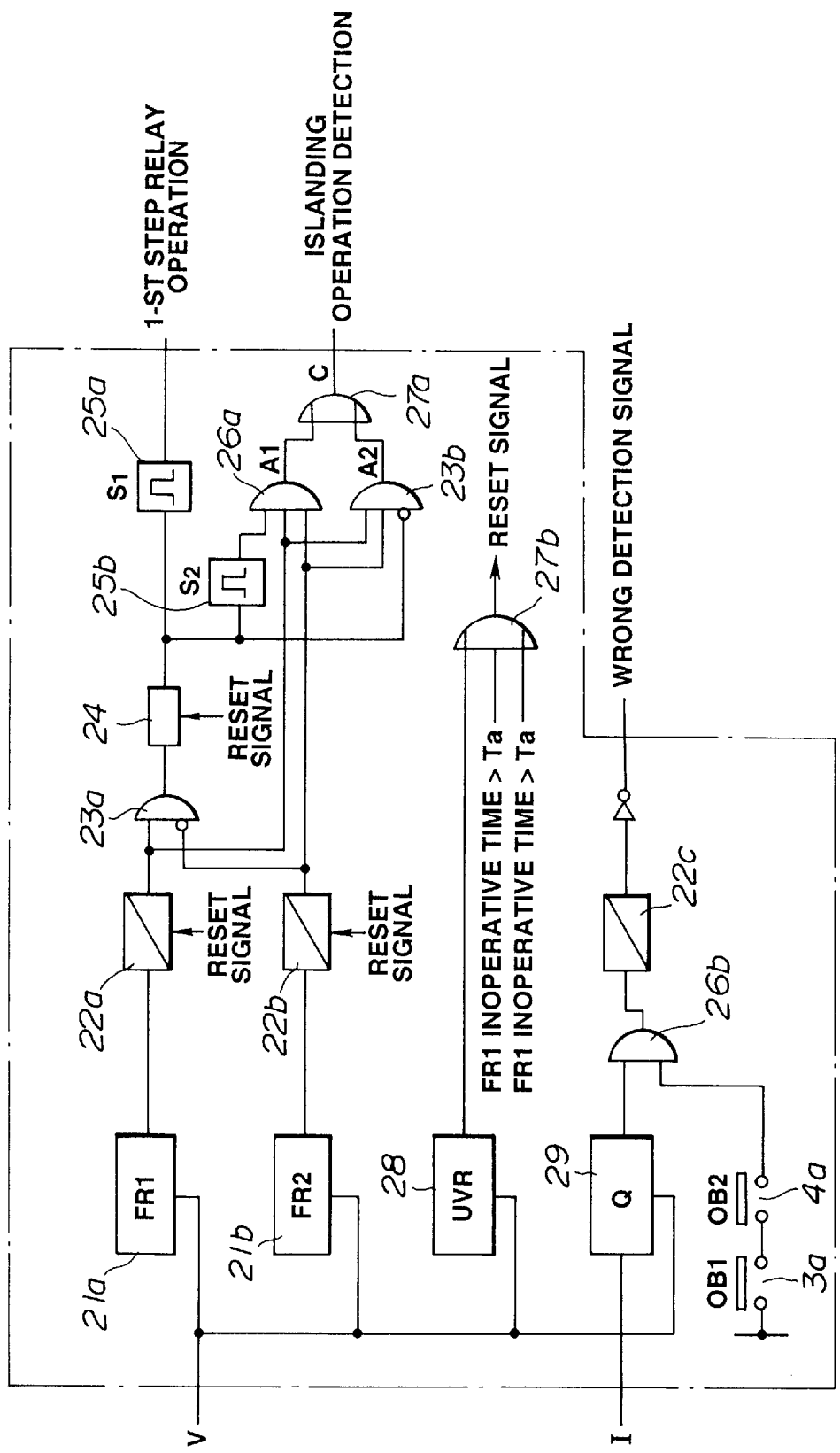
FIG. 25 is a circuit diagram of an essential part of the islanding operation detecting system of FIG. 24.

As shown in FIG. 25, a first-step relay 21a and a second-step relay 21b are operated upon receiving the voltage detection signal V. A first step integral timer 22a receives the output signal of the first-step relay 21a, a second-step integral timer 21b receives the output of the second-step relay 22a. A first NAND gate 23a receives the output signals of the first integral timer 22a and the second integral timer 22b as AND condition. An on-delay timer 24 is turned on by receiving the NAND output signal of the NAND gate 23a. First and second switching amplitude circuits 25a and 25b receive the ON output signal of the on-delay timer 24 and respectively output signals $B_1$ and $B_2$ after a predetermined on-time. A first AND gate 26a receives the output signals of the second switching circuit 25b, the first integral timer 22a and the second integral timer 22b as AND condition. A first OR gate 27a receives an output signal $A_1$ of an AND gate 26b and an output signal $A_2$ of a NAND gate 23b. A under voltage relay (UVR) 28 receives the voltage detection signal V of the transformer 8. Further, a second OR gate 27b, a reactive power detection circuit 29 which receives the electric current signal I and the voltage detection signal V as input, a second AND gate 26b which receives the output signal of the reactive power detection circuit (Q) 29, the contact input signal of auxiliary contacts 3a and 4a of the circuit breakers 4 and 5 as AND condition, and a third integral timer 22c.

The manner of operation of the islanding operation detecting system of this embodiment will be discussed hereinafter.

The calculating section 41 of the calculation control section 40 receives an electric current detection signal I indicative of the electric current flowing through the distribution wire 15 and a voltage signal V by the transformer 8 as input. The calculation section 41 calculates an optimum small-deviation of the frequency and its magnitude on the basis of the signals I and V, a generator constant, an automatic voltage regulator transfer function and a governor transfer function.

The first-step and second-step frequency relays 21a and 21b are operated upon receiving the voltage detection signal V. The first integral timer 22a executes a delay integral of the output signal of the first-step frequency relay 21a and supplies its output to the first NAND gate 23a, the first AND gate 26b and the second NAND gate 23b. Similarly, the second integral timer 22b executes a delay integral of the output signal of the second-step frequency relay 21b and supplies its output to the first NAND gate 23a, the first AND gate 26a and the second NAND gate 23b. The first NAND gate 23a outputs its output signal to the on-delay timer 24 only when the first integral timer 22a outputs a signal. The output signal of the on-delay timer 24 is supplied to the first and second switching amplifier circuit 25a and 25b and the second NAND gate 23b. The first switching amplifier circuit 25a is turned on for a predetermined time period in reply to the input of the signal and outputs a first-step relay operation signal indicative that the small deviation amplifier signal during the operation of the first-step frequency signal to the disturbance signal generating section 30. The second switching amplifier circuit 25b is also turned on for a predetermined time period in reply to the input of the signal and outputs the output signal to the first NAND gate 26a. The first NAND gate 26a is operated and outputs an output signal $A_1$ to the first NOR gate 27a only when all of the first and second integral timers 22a and 22b and the second switching amplifier circuit 25b output the output signals. The second NAND gate 23b outputs an output signal $A_2$ to the first OR gate 27a when the first and second integral timer 22a and 22b output signals and the on-delay timer 24 does not output a signal. The first NOR gate 27a receives the output signal $A_1$ of the first NAND gate 26a and the output signal $A_2$ of the second NAND gate 23b as OR condition and outputs the islanding operation detecting signal of the synchronous generator 2 to the circuit breaker 3.

The under voltage relay 28 of the frequency relay section 20 receives the voltage detection signal V and detects an under voltage, and outputs its output signal to the second OR gate 27b. The second OR gate 27b outputs a reset signal when the non-operable period of the first-step frequency relay 21a is greater than a predetermined value and when the non-operable period of the second-step frequency relay 21b is greater than a predetermined value. The reactive power detection relay 29 receives the electric current signal I and the voltage detection sign V and outputs its output signal to the second AND gate 26b. The second AND gate 26b receives the output signal of the reactive power detection relay 29, the contact signal of the auxiliary contact 3a of the interconnecting circuit breaker 3 and the contact signal of an auxiliary contact 4a of the consumer circuit breaker 4 and output a detection signal indicative of the disturbance signal generating section is in trouble.

In the disturbance signal generating section 30, the disturbance signal generator 31 receives the output signal of the calculating section 41 and outputs a low-gain disturbance signal or high-gain disturbance signal. A NAND gate 32 receives the low-gain disturbance signal from the disturbance signal generator 31, the first-step frequency relay operation signal from the frequency relay section 20, the contact signals of the respective auxiliary contacts 3b and 4b as input condition and outputs its output signal to the OR gate 34. The AND gate 33 receives the high-gain disturbance signal of the disturbance signal generator 31, the first-step frequency relay operation signal from the frequency relay section 20, the contact signals of the respective auxiliary contacts 3*b* and 4*b* as input condition and outputs its output signal to the OR gate 34. The OR gate 34 outputs its output signal to the automatic voltage regulator 9 as the voltage set value small deviation signal.

The disturbance signal generating section 30 functions to supply a small deviation of a predetermined period to the voltage set value of the automatic voltage controller 9 of the synchronous generator 2. The disturbance signal generator 31 outputs the small deviation signal of a predetermined period. The period and the magnitude of the deviation signal is obtained by the calculation of the calculation control section 40.

The calculation control section 40 calculates the cycle period and the magnitude of the small deviation from the equation (11) or (12) described later, and outputs the calculated result to the disturbance signal generating second 30. Therefore, by inputting the voltage V and the electric current I of the generator, the machine constant of the generator 1, the transfer function of the automatic voltage regulator 9 and the transfer function of the governor to the calculating section 41, and by substituting the obtained result and the above-mentioned constant and the transfer function value to the equation (11), the transfer function represented by the equation (12) is calculated. Therefore, it becomes possible to obtain the deviation cycle so as to be the maximum sensitivity.

The settling value of the frequency relay section 20 is determined at a value by which no malfunction occurs in the normal frequency during the system interconnected condition. Therefore, the magnitude of the deviation amount is determined so that the deviation of the frequency during the islanding operation becomes greater than the settling values. The magnitude and the frequency of the calculated optimum deviation amount are outputted to the calculation control section 40. The frequency relay section 20 receives the voltage V of the generator as input and obtains the deviation of the frequency. When the value becomes greater than the settling value, the frequency relay section 20 detects the islanding operation of the synchronous generator 2 and outputs a trip command to the interconnecting circuit breaker 3 so as to prevent the islanding operation of the synchronous generator 2.

More particularly, as a counterplan to the wrong detection of the islanding operation, the frequency relay section 20 is provided with the first-step frequency relay (FR1) 21*a* having a low-settling value and the second-step frequency relay (FR2) 21*b* having a high-settling value. When the first-step relay 21*a* is operated and the second-step relay 21*b* is not operated, the magnitude of the small deviation of the voltage set value of the automatic voltage controller 9 is amplified for a predetermined time which is determined by the turning-on operation of a circuit 25*a* for a predetermined time from a signal input. Further, for a predetermined time which is similarly determined by the turning-on operation of a circuit 25*b* as similar to the circuit 25*a* from a time that the condition is satisfied and in case that the first-step and second-step frequency relays 21*a* and 21*b* are both operated, the system decides that the synchronous generator 2 is in the islanding operation.

When the generator 2 starts the islanding operation in case that the power flow of the interconnecting point of the system side is large, the unbalance of the input and the output of the synchronous generator 2 becomes large and the frequency of the generator is also raised up. Accordingly, just after the start of the islanding operation as mentioned above, both of the first-step and second-step frequency relays 21*a* and 21*b* may be operated. In order not to generate the delay of the detection time for this islanding operation, the apparatus according to the present invention is arranged to detect the islanding operation without amplifying the magnitude of the small deviation when both of the first-step and second-step frequency relays 21*a* and 21*b* are operated. The settling value of the first-step frequency relay 21*a* is determined so as not to generate a malfunction due to the normal deviation of the frequency during the system interconnected condition, and the settling value of the second-step frequency relay 21*b* is determined so that the magnitude thereof corresponds to the amplified small deviation amount. This enables the islanding operation to be reliably executed.

Figure 26:
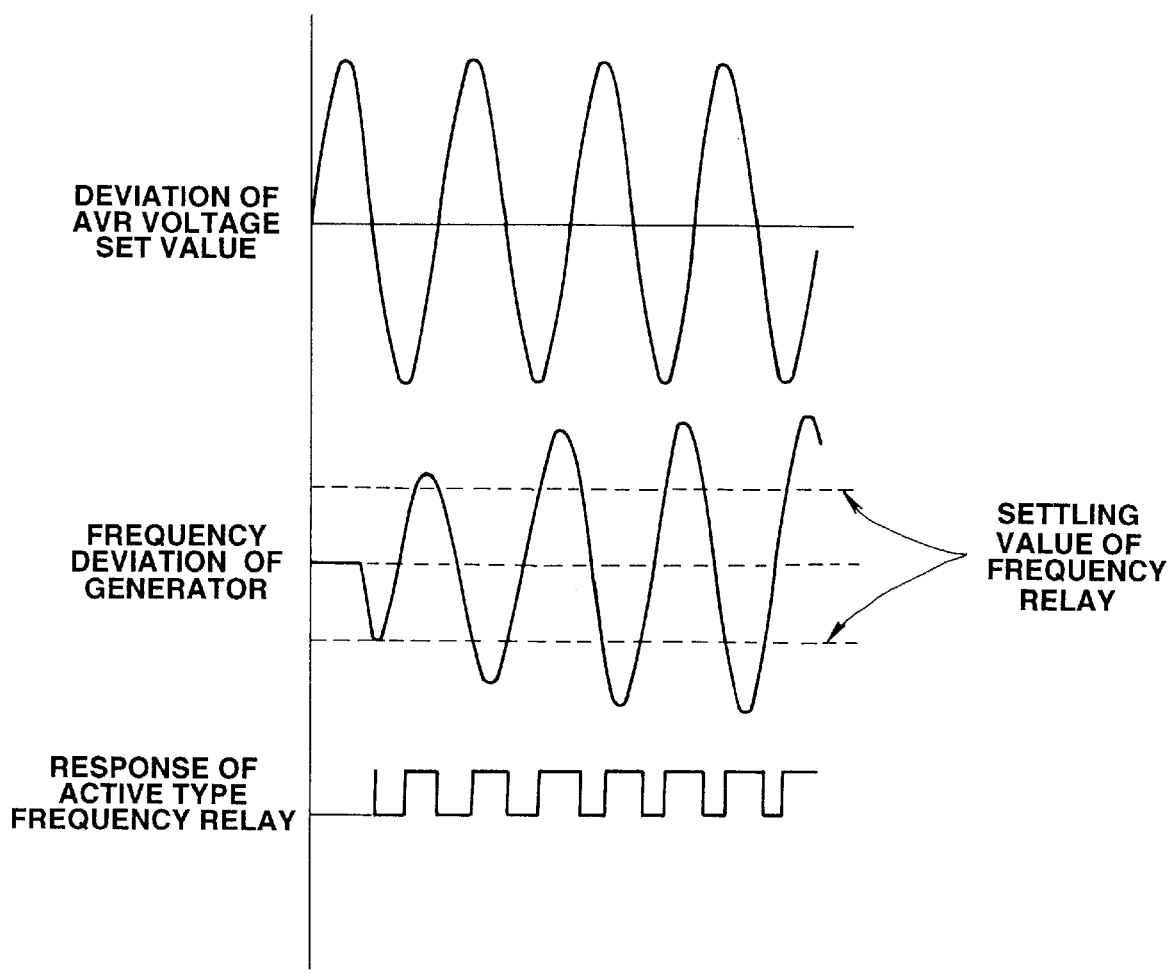
FIG. 26 is a waveform graph which shows a relationship of a frequency deviation and a relay response by active method.

FIG. 26 shows operation of the frequency relays 21*a* and 21*b* of an active type at a time after the generator 2 starts the islanding operation in a condition that the power flow of the system interconnected point is zero. The frequency of the generator 2 after the start of the islanding operation of the generator 2 is changed to generally form a sine wave, and its magnitude is gradually increased according to the elapse of the time to the stationary condition, as shown by a simulation result of FIGS. 33 to 36. Therefore, each active type frequency relay 21*a*, 21*b*, which operates when the deviation of the frequency becomes larger than the predetermined value, repeats the operational reset as shown in Figures.

On the other hand, since the synchronous generator 2 is accelerated to increase its frequency when the short-circuit trouble is occurred in the system, a timer 22*a*, 22*b* is installed to each frequency relay 21*a*, 21*b* in order to prevent a wrong detection due to such trouble. The settling value of the timer 22*a*, 22*b* is set to ensure a sufficient time for solving the trouble by a short-circuit solving relay installed in a distribution substation. Since the timer 22*a*, 22*b* is arranged to repeat the counting and reset after the islanding operation is started, the delay of the detection time is prevented by adopting the integral method. Further, since the under voltage relay (UVR) 28 may detect such short-circuit accident, the under voltage relay 28 is installed to lock the output of the frequency relay to prevent the erroneous detection of the short-circuit accident.

Figure 27:
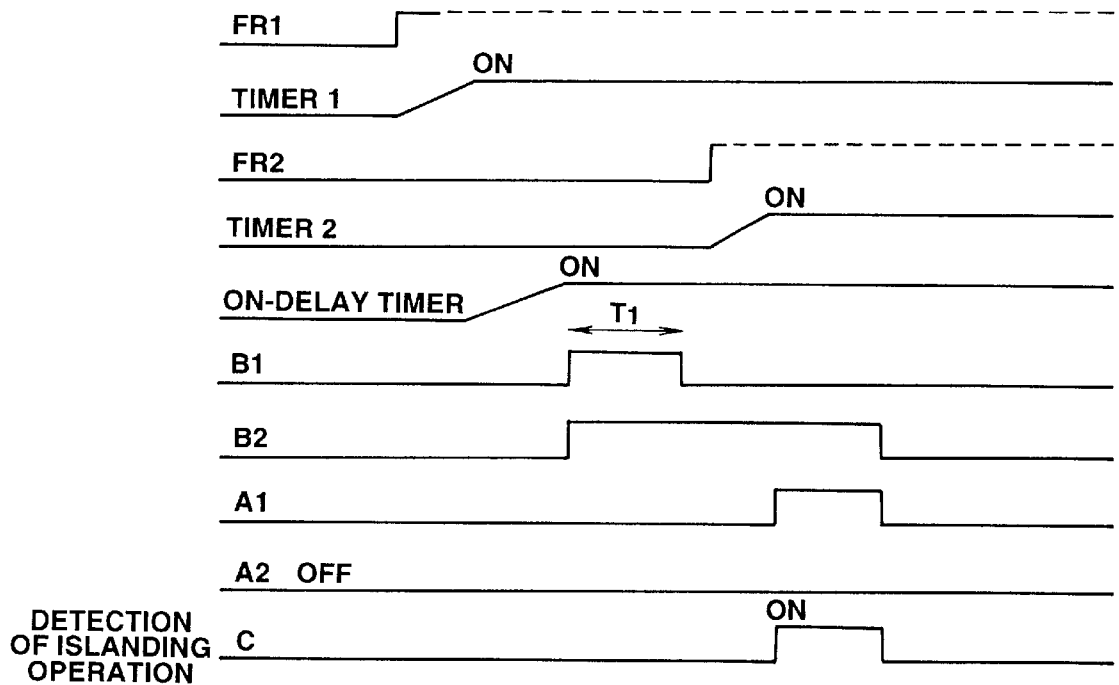
FIG. 27 is a time-chart graph which shows an operation of the essential part of the system of FIG. 24.
Figure 28:
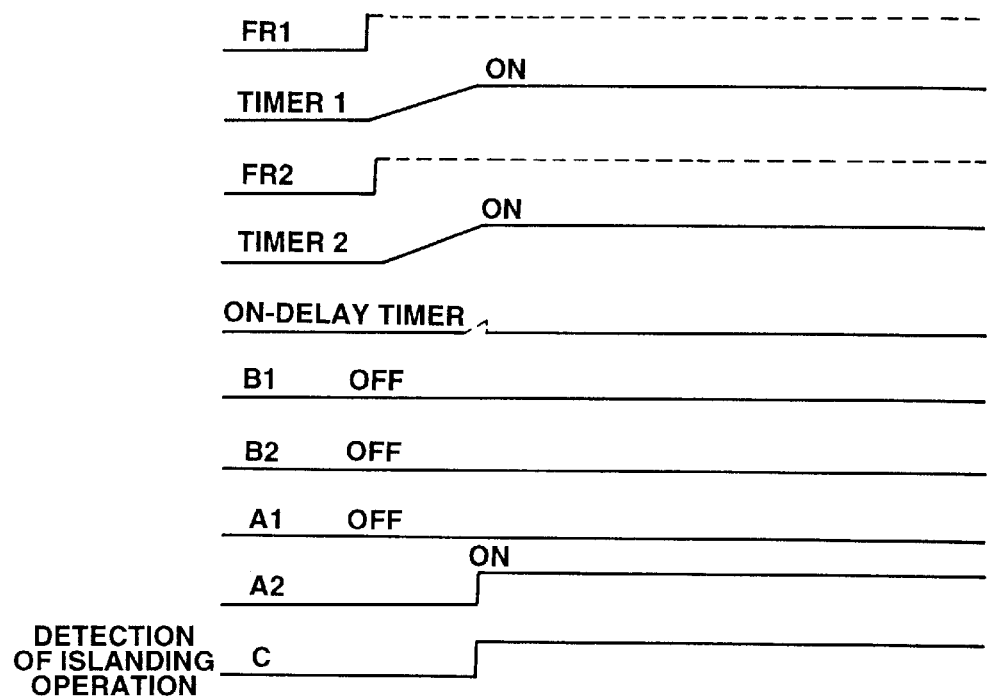
FIG. 28 is a time-chart graph which shows an operation of the essential part of the system of FIG. 24.
Figure 29:
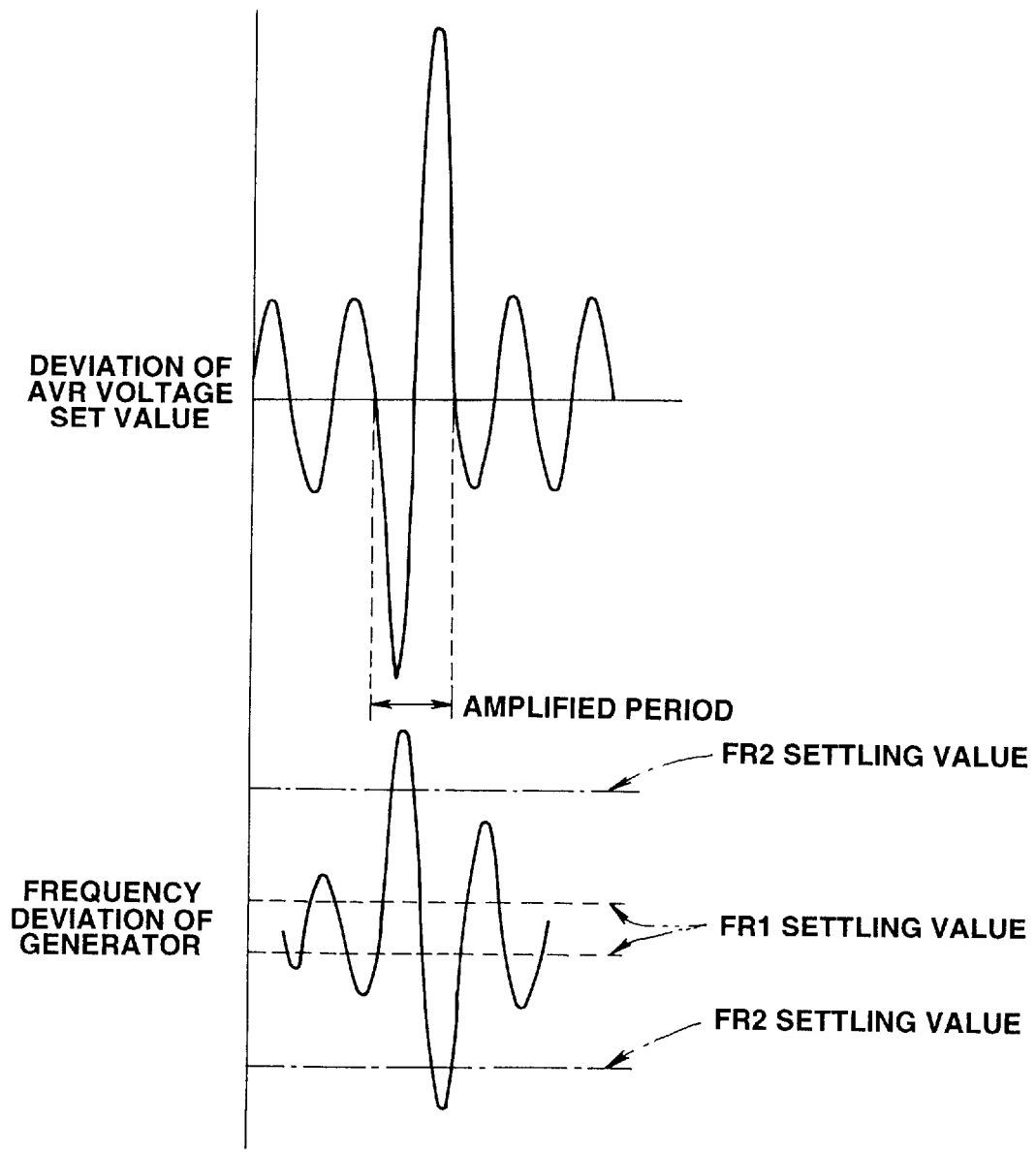
FIG. 29 is a time-chart graph which shows an operation of the essential part of the system of FIG. 24.

The set condition of the timer 22*a*, 22*b* is to be executed during the operation of the under voltage relay 28. FIGS. 27 to 29 shows operational sequences of the frequency relay section 20. The time chart of FIG. 27 shows basic operation wave forms and shows operation waveforms of the islanding operation detection by amplifying the small deviation due to the operation of the first-step frequency relay 21*a*. The time chart of FIG. 28 shows operation waveforms in case that the first-step frequency relay 21*a* and the second-step frequency relay 21*b* perform the same operations. FIG. 29 shows waveforms when the small deviation value is amplified by the operation of the first-step frequency relay 21*b*. In FIGS. 27 and 28, FR1 and FR2 denotes operating waves of the first-step and second-step frequency relays 21*a* and 21*b*. Timer 1 and timer 2 denotes operating waves of the integral timers 22*a* and 22*b*. $B_1$ and $B_2$ denote output waves of the switching amplifier circuits 25*a* and 25*b*. $A_1$ denotes an output waveform of the AND gate 26*a*. $A_2$ denotes an output waveform of the NAND gate. C denotes detection a waveform of the islanding operation. As shown in FIG. 28, the settling value of the on-delay timer 24 is to be set at a value greater than the dispersion of the operating time of the first-step frequency relay 21a and the second-step frequency relay 21b in case that the settling value or the reset signal $T_1$ of the first integral timer 22a is the same as that of the reset signal $T_2$ of the second integral timer 22b.

[Simulation]

As to such active type detection, a digital simulation of the second embodiment was carried out as shown in FIGS. 30 to 38.

Figure 30:
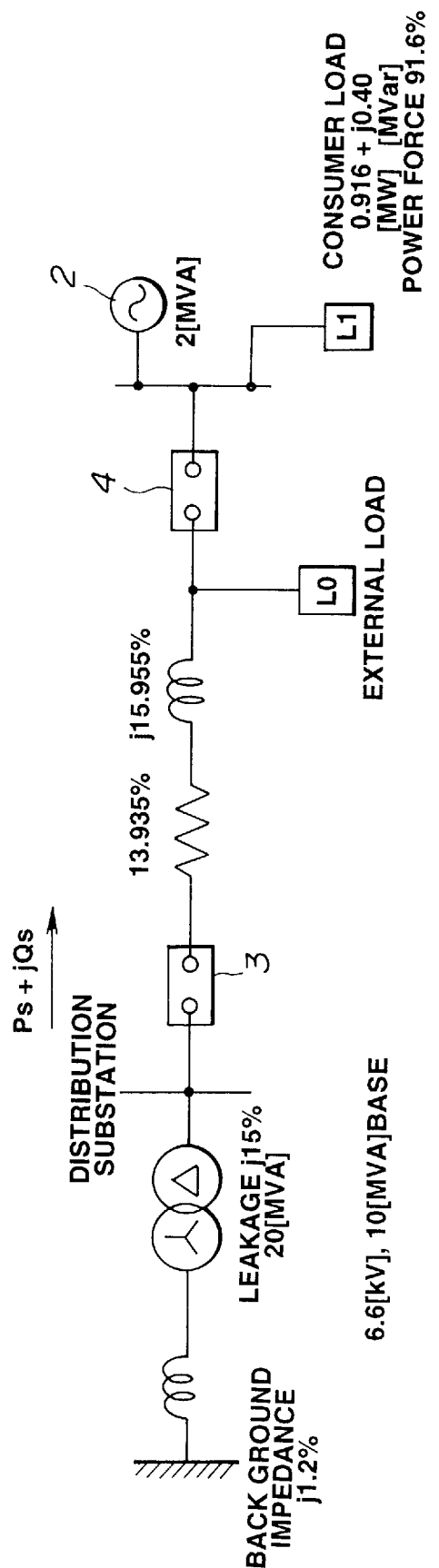
FIG. 30 is a circuit diagram of an electric power system of a simulation according to the present invention.

FIG. 30 shows a system view including system constants. Table 2 and FIGS. 31 and 32 respectively show the machine constants of the generator 2 and the constant of the governor thereof and the constant of the automatic voltage regulator. The effective power output of the generator 2 is 1.83 MW. The reactive power output is 0.4 MVA. The remaining effective power 0.916 MW becomes a reversely power flow to be consumed at an external load $L_0$. Under this condition, the power flow at the circuit breaker CB0 of the interconnected point of the system side becomes zero.

TABLE 2

| rated frequency | [Hz] | 50 |
| --- | --- | --- |
| reference capacity | [MVA] | 2 |
| reference voltage | [kV] | 6.6 |
| armature resistance | Ra [PU] | 0.0185 |
| armature leakage reactance | X1 [PU] | 0.104 |
| d-axis synchronous reactance | Xd [PU] | 1.90 |
| q-axis synchronous reactance | Xq [PU] | 0.99 |
| d-axis transient reactance | Xd' [PU] | 0.265 |
| q-axis transient reactance | Xq' [PU] | 0.88 |
| d-axis subtransient reactance | Xd" [PU] | 0.172 |
| q-axis subtransient reactance | Xq" [PU] | 0.192 |
| d-axis open-circuit transient time-constant | Tdo' [PU] | 2.64 |
| q-axis open-circuit transient time-constant | Tqo' [PU] | 0.133 |
| d-axis open-circuit subtransient time-constant | Tdo"[sec.] | 0.033 |
| q-axis open-circuit subtransient time-constant | Tqo"[sec.] | 0.104 |
| zero-phase resistance | Rn [Ω] | 0.036 |
| zero-phase reactance | Xd1 [Ω] | 4.14 |
| moment of inertia | M [sec.] | 2.36 |

FIGS. 33 to 36 respectively show the deviation amounts of the AVR voltage set value, the terminal voltage, the generator frequency, and the deviation amount of the reactive voltage of the generator 2. As shown in FIGS. 33 to 36, although the generator frequency was almost not deviated in the system interconnected condition, its deviation became large after the islanding operation started. The terminal voltage of the generator 2 was similarly changed. On the other hand, the deviation amount of the reactive power performed a reverse tendency against that of the generator frequency.

Figure 37:
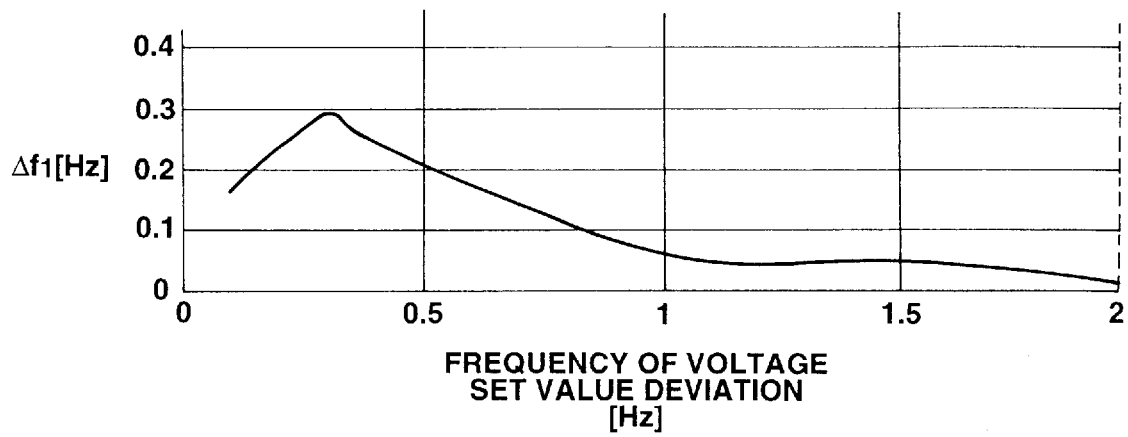
FIG. 37 is a graph which shows a relationship between the deviation of the AVR voltage set value and the deviation of the generator frequency obtained by the simulation.
Figure 38:
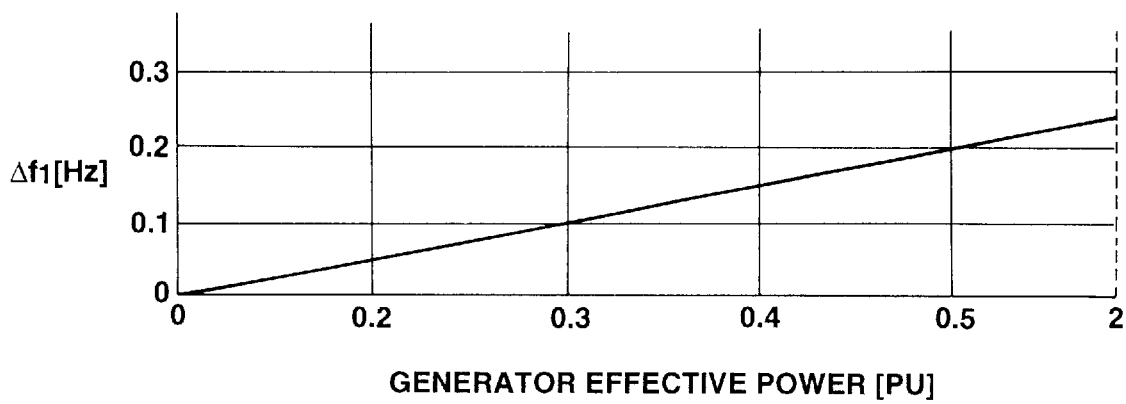
FIG. 38 is a graph which shows a relationship between the generator effective power and the generator frequency obtained by the simulation.

Next, FIG. 37 shows the deviation of the frequency in the islanding operation when the deviation amount (1%) of the voltage set value of the automatic voltage regulator (AVR) was constant and the deviation cycle was changed. The graph of FIG. 37 represents that the maximum sensitivity was obtained at 0.4 Hz deviation period (cycle). In order to decrease the influence to the system in the system interconnected condition as possible, it is important to select such deviation period for obtaining the maximum sensitivity. FIG. 38 shows the frequency of the generator in the islanding operation when the deviation amount of the voltage set value of the automatic voltage regulator (AVR) was fixed at 1% and the frequency period was fixed at 0.4 Hz, and the effective power of the generator was changed. This represents the frequency was deviated in proportion to the effective power of the generator 2.

[Theoretical Study of Active Method]

Since the model of the generator is almost not influenced by the damper coil in the active method, a transient model in which the influence of the damper coil is neglected is applied thereto.

According to the two-axis theory for the synchronous generator, the following equations are established in the islanding operation.

$$T_e = L_T(E'_q)^2 \quad (1)$$

$$V_{fd} = L_{fd}Eq' + T_{d'0}(d/dt)E_q' \quad (2)$$

$$E_t = L_{et}E_q' \quad (3)$$

wherein $T_e$, $V_{fd}$ and $E_t$ represent electrical output torque, field voltage and terminal voltage of the generator, respectively. Eq' is q-axis transient voltage of the generator, Td'0 is d-axis open-circuit transient time-constant, and $L_t$, $L_{fd}$ and $L_{et}$ are defined by the following equations (4).

$$L_T = \frac{R_L Z_L^2 (X_q^2 R_L^2 + X_q X_L Z_L^2 + X_q^2 X_L^2 + Z_L^4 + Z_L^2 X_q X_L)}{\{(Z_L^2 + X'_d X_L)(Z_L^2 + X_q X_L) + X'_d X_q R_L^2\}^2} \quad (4)$$

$$L_{et} = \frac{Z_L^2 \sqrt{R_L X_q^2 + (Z_L^2 + X_q X_L)^2}}{(Z_L^2 + X'_d X_L)(Z_L^2 + X_q X_L) + X'_d X_q R_L^2}$$

$$L_{fd} = \frac{(X_d - X'_d)\{X_q R_L^2 + X_L(Z_L^2 + X_q X_L)\}}{(Z_L^2 + X'_d X_L)(Z_L^2 + X_q X_L) + X'_d X_q R_L^2} + 1$$

$Z_L = R_L + jX_L$ is an impedance corresponding to the output of the generator. The constants except for $Z_L$ in the equations (4) are represented in Table 1. Since the deviation due to the active method is very small, by executing the liner-approximate and Laplace transformation to the equations (1) to (3), the following equations are obtained.

$$\Delta T_e = 2L_T E_{q'0} \cdot \Delta E_q' \quad (5)$$

$$\Delta V_{fd} = (L_{fd} + ST_{d'0}) \cdot \Delta E_q' \quad (6)$$

$$\Delta E_t = L_{et} \Delta E_q' \quad (7)$$

wherein $\Delta T_e$, $\Delta V_{fd}$, $\Delta E_t$ and $\Delta E'q$ are the Laplace transformation values at to the very small deviation of the $T_e$, $V_{fd}$, $E_t$ and E'q; Eq'0 is an average value of Eq' in the system interconnected condition.

Figure 31:
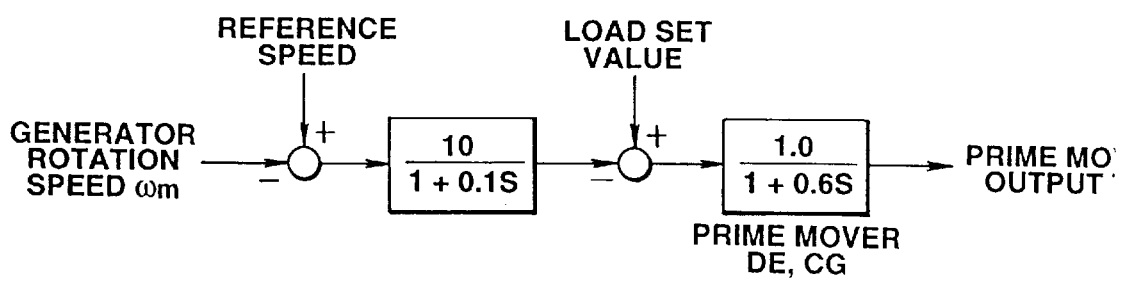
FIG. 31 is a block diagram which shows a control-circuit constant of a governor applied to the system of FIG. 30.

Next, as to the governor circuit shown in FIG. 31, assuming that the reference speed and the load set value are constant, and by executing the linear approximate, the following equation is obtained.

$$\Delta T_m = -G_{GOV} \Delta \omega_m \quad (8)$$

wherein $\Delta T_m$ and $\Delta \omega_m$ are Laplace transformation values of the prime mover output Tm and the generator rotation speed $\omega_m$ with respect to the very small deviation, $G_{GOV}$ is a transfer function of the governor and is $G_{GOV}=\{10.0/(1+0.1\,S)\}\times\{1.0/(1+0.6\,S)\}$.

Figure 32:
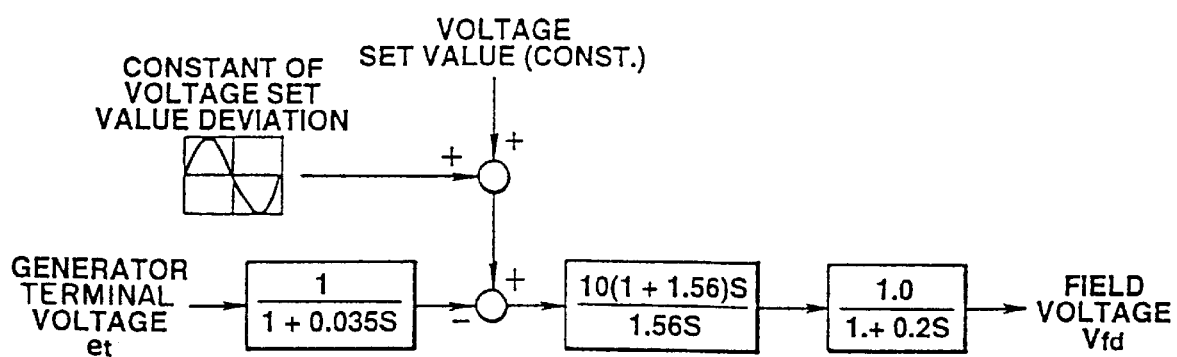
FIG. 32 is a block diagram which shows a circuit constant of an automatic voltage regulator applied to the system of FIG. 32.
Figure 33:
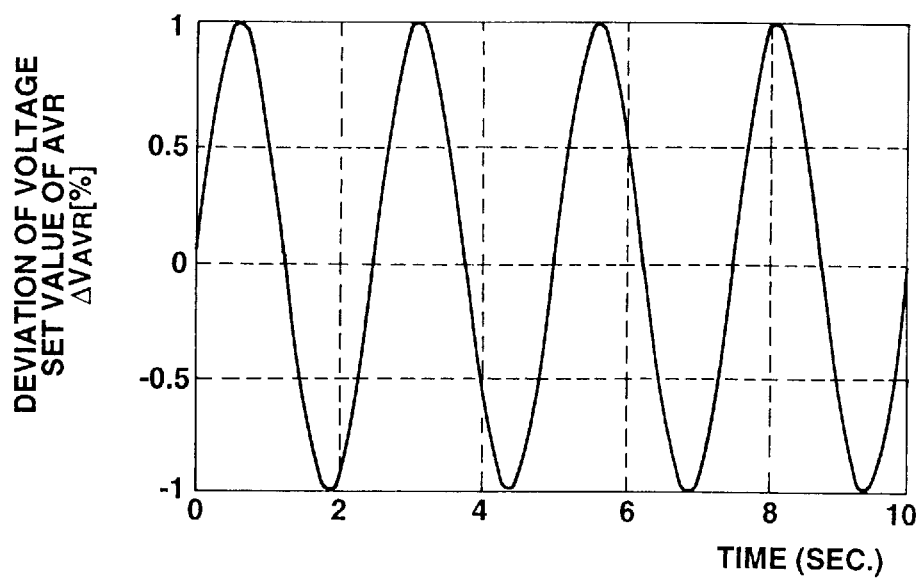
FIG. 33 is a graph which shows a characteristic waveform of a deviation of a voltage set value of an automatic voltage regulator obtained by the simulation.
Figure 34:
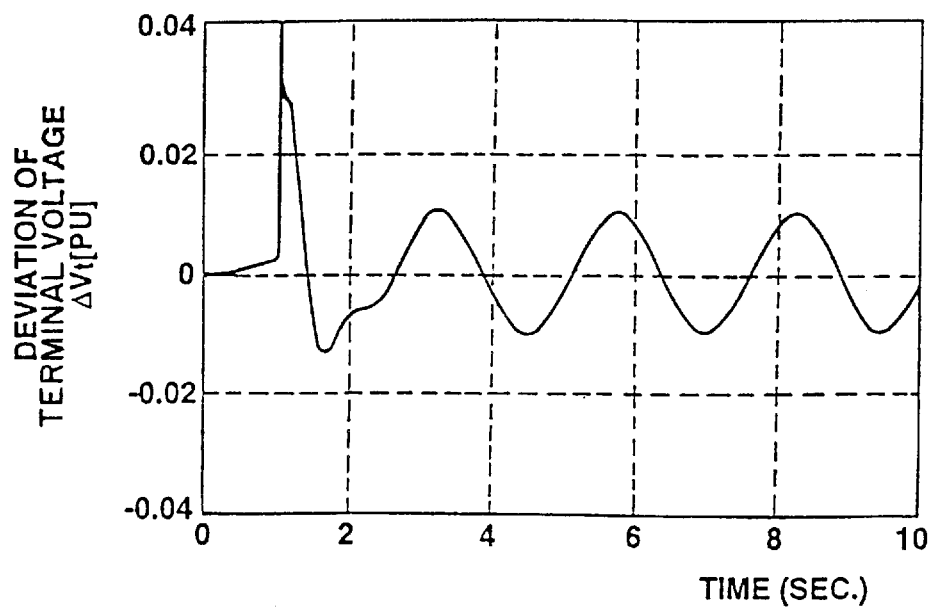
FIG. 34 is a graph which shows a characteristic waveform of a terminal voltage of the generator obtained by the simulation.
Figure 35:
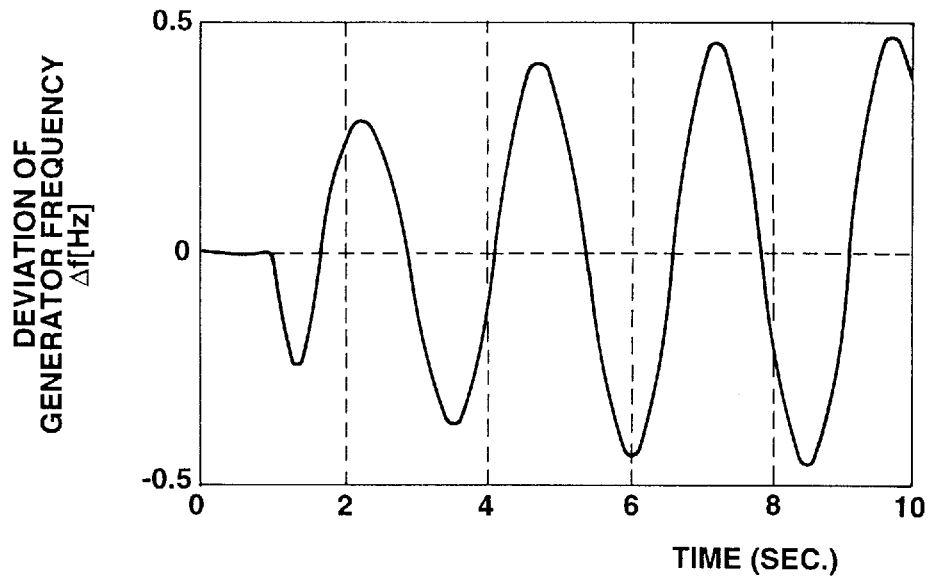
FIG. 35 is a graph which shows a characteristic waveform of a frequency of the generator obtained by the simulation.
Figure 36:
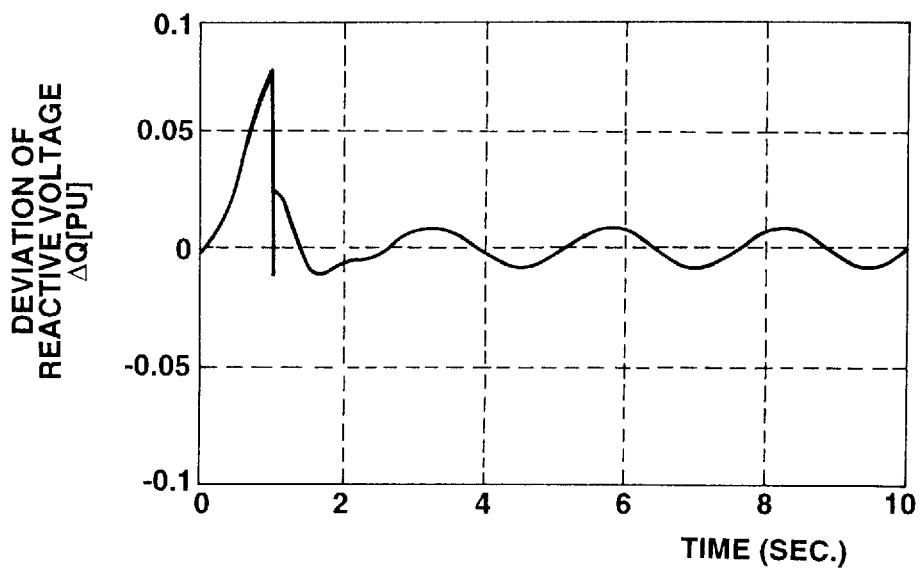
FIG. 36 is a graph which shows a characteristic waveform of reactive power of the generator in the simulation.

As to the automatic voltage regulator (AVR) circuit of FIG. 32, the time-constant of the terminal voltage detection circuit is neglected due to its small value. The following equation is obtained by linear approximating it.

$$\Delta V_{fd} = G_{AVR}(\Delta V_{AVR} - \Delta E_t) \quad (9)$$

wherein $\Delta V_{AVR}$ is a transfer function with respect to the AVR voltage set value, $G_{AVR}$ is the AVR circuit transfer function and is $G_{AVR}=\{10.0(1+1.56\,S)/1.56\,S\}\times\{1.0/(1+0.2\,S)\}$.

The following equation is obtained by linear-approximating the swing equation of the generator.

$$2H(d\Delta\omega_m/dt) = \Delta T_m - \Delta T_e \quad (10)$$

wherein 2H is an inertia constant of the generator (including prime mover).

Figure 39:
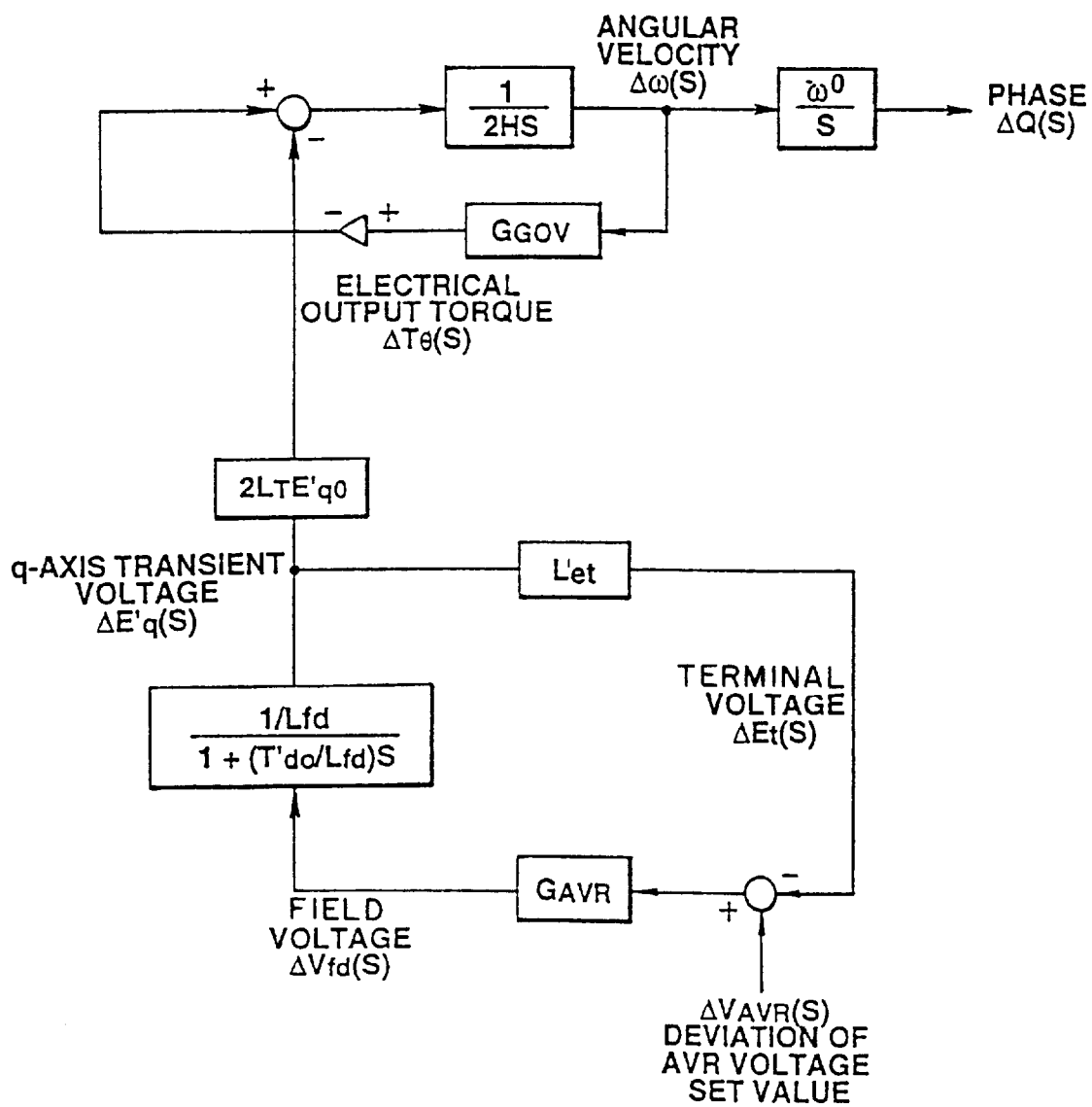
FIG. 39 is a block diagram which shows a transfer function block diagram of the simulation according to the present invention.

FIG. 39 shows a block diagram of the transfer function in the islanding operation, from the equations (5) to (10). From the block diagram of FIG. 39, the transfer function $\Delta\omega_m$ of the generator frequency with respect to the deviation $\Delta V_{AVR}$ of the set value of the AVR voltage is obtained as follows.

$$\Delta\omega_m = \frac{-\dfrac{2L_t E'_q 0}{L_{fd}} G_{AVR} \Delta V_{AVR}}{(2HS + G_{GOV})\left(1 + \dfrac{T_{do}}{L_{fd}} S = \dfrac{L_{et}}{L_{fd}} G_{AVR}\right)} \quad (11)$$

The frequency deviation of the generator in the islanding operation, is determined by the constants $L_t$, $L_{fd}$ and $L_{et}$, which are determined by the machine constant and the output condition of the generator, the average value Eq'0 of the q-axis transient voltage in the system interconnected condition, d-axis open-circuit transient time-constant Td'0 and the transfer functions $G_{AVR}$ and $G_{GOV}$ of the AVR circuit and the governor circuit, and the unit inertia constant 2H of the generator to the equation (11).

When the effective power output of the generator is 1.83 MW, the reactive power output is 0.267 MVA, and the power flow of the system interconnected point is zero in the equation (11), the transfer function of $\Delta\omega_m$ is obtained as follows.

$$\Delta\omega_m = \frac{184.5 S^3 + 2271 S^2 + 4454 S + 1971}{0.1166 S^6 + 2.039 S^5 + 15.08 S^4 + 82.78 S^3 + 166.3 S^2 + 338.3 S + 196.7} \Delta V_{AVR} \quad (12)$$

Figure 40:
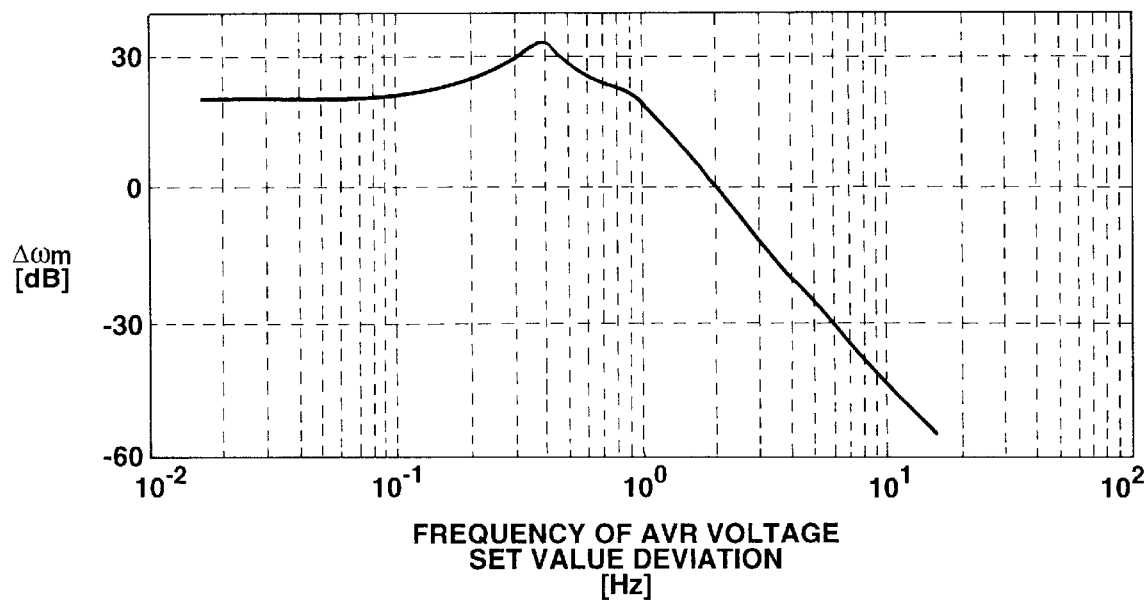
FIG. 40 is a graph which shows Bode diagram of the generator frequency applying the transfer function of FIG. 39.
Figure 41:
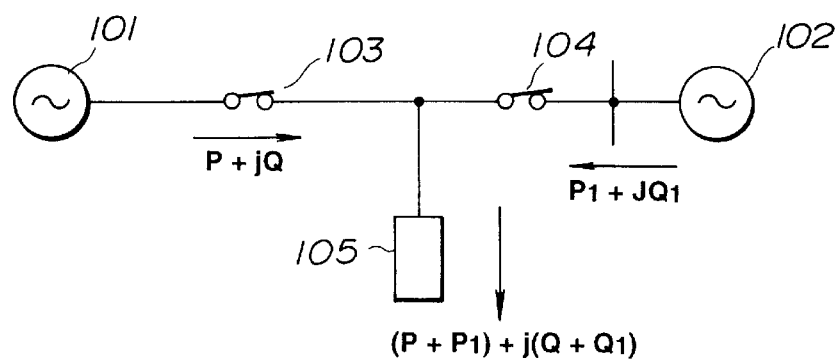
FIG. 41 is a circuit diagram which shows a conventional connection of a distribution electric source in a power system.

The equation (12) represents that the frequency deviation of the generator can be obtained by the output condition of the generator, the machine constant of the generator, the transfer functions of the AVR circuit and the governor circuit, the deviation amount of the voltage set value of the AVR and the deviation cycle. FIG. 40 shows Bode diagram as to the equation (12). In this diagram, the maximum sensitivity is obtained when the deviation frequency of the AVR voltage set value is 0.4 Hz. This fact is generally in correspondence with the simulation result shown in FIG. 37.

What is claimed is:

1. A method for detecting an islanding operation of a rotating-machine type dispersed generator, the dispersed generator being interconnected with a main electric source through a circuit breaker to constitute an electric power system, the method comprising the steps of:

calculating a frequency deviation and a period of electric power of the electric power system from an output and a machine constant of the dispersed generator, a transfer function of an automatic voltage regulator (AVR) of the dispersed generator, and a transfer function of a governor of the dispersed generator; and outputting an islanding operation signal indicating that the dispersed generator is executing the islanding operation from a frequency relay section when the calculated deviation becomes greater than a settling value.

2. A method as claimed in claim 1, wherein the frequency relay section includes a first-step frequency relay setting a low settling value and a second-step frequency relay setting a high settling value, the frequency relay section executing the detection of the islanding operation when the magnitude of the deviation of the voltage set value is amplified for a predetermined time by the satisfaction of a condition that the first-step frequency relay is operated and the second-step frequency relay is not operated and then when both of the first-step and second-step frequency relays are operated; the detection of the islanding operation being executed without amplifying the magnitude of the very small deviation when both of the first-step and second-step frequency relays are operated.

3. A method as claimed in claim 1, wherein the frequency relay section detects the islanding operation of the generator when a time the deviation amount of the frequency is greater than the settling value is summed and its sum becomes greater than the predetermined time.

4. A method as claimed in claim 3, wherein the detection of the islanding operation due to the acceleration of the dispersed generator by the short-circuit accident of the system which is not interconnected with the dispersed generator is prevented by being in timed relation with a short-circuit removing relay of the system.

5. A method as claimed in claim 1, wherein the frequency relay section executes a lock of the output signal of the frequency relay by the operation of the short-circuit accident detection relay, and preventing the detection of the islanding operation with respect to the acceleration of the dispersed generator in the short-circuit accident of the system not interconnected with the dispersed generator.

6. A method as claimed in claim 1, wherein a condition of the dispersed generator is detected by the open-and-close signal of the circuit breaker, the disturbance signal generating section outputting the deviation signal to the automatic voltage regulator only when the dispersed generator is interconnected with the electric power system.

7. A method as claimed in claim 1, wherein the frequency relay monitors the deviation amount of the reactive power of the dispersed generator and detecting the abnormality of the disturbance signal generating section.

8. A method as claimed in claim 7, wherein the system interconnected condition of the dispersed generator is detected by the open-and-close signal of the system interconnecting circuit breaker, the abnormality of the disturbance signal generating section being detected only when the dispersed generator is interconnected with the electric power system to prevent a wrong detection of the abnormality of the disturbance signal generating section due to the decrease of the deviation amount of the reactive power of the dispersed generator due to the deviation of the voltage set value of the dispersed generator.

9. A method according to claim 1, further comprising the steps of:

inputting a disturbance signal from a disturbance signal generating section to the automatic voltage regulator when the frequency deviation, the period and the islanding operation signal are obtained; and deviating a voltage set value of the automatic voltage regulator by a predetermined cycle by outputting a voltage set value deviating signal from the disturbance signal generating section to the automatic voltage regulator.

10. A method according to claim 1, wherein the frequency deviation is calculated by using the following equation:

$$\Delta\omega_m = -\frac{\dfrac{2L_t Eq'O}{L_{fd}} G_{AVR} \Delta V_{AVR}}{(2HS + G_{GOV})\left(1 + \dfrac{Td'o}{L_{fd}} S + \dfrac{L_{et}}{L_{fd}} G_{AVR}\right)}$$

wherein $L_t$, $L_{fd}$ and $L_{et}$ are constants determined by the machine constant and the output condition of the generator, Eq'0 is an average value of a q-axis transient voltage in a system interconnected condition, Td'0 is a d-axis open circuit transient time-constant, $G_{AVR}$ and $G_{GOV}$ are transfer functions of the AVR circuit and the governor circuit, respectively, and 2H is an unit inertia constant of the governor.

11. An apparatus for detecting an islanding operation of a rotating-machine type dispersed generator, the dispersed generator being interconnected with a main electric source through a circuit breaker to constitute an electric power system, the apparatus comprising:

means for calculating a frequency deviation and a period of electric power of the electric power system from an output and a machine constant of the dispersed generator, a transfer function of an automatic voltage regulator of the dispersed generator, and a transfer function of a governor of the dispersed generator;

means for outputting an islanding operation signal indicative that the dispersed generator is executing the islanding operation from a frequency relay section when the calculated deviation becomes greater than a settling value;

means for inputting a disturbance signal from a disturbance signal generating section to the automatic voltage regulator when the frequency deviation, the period and the islanding operation signal are obtained; and means for deviating a voltage set value by a predetermined period cycle by outputting a voltage set value deviating signal from the disturbance signal generating section to the automatic voltage regulator.

12. An apparatus as claimed in claim 11, wherein the frequency relay section includes a first-step frequency relay setting a low settling value and a second-step frequency relay setting a high settling value, the frequency relay section executing the detection of the islanding operation when the magnitude of the deviation of the voltage set value is amplified for a predetermined time by the satisfaction of a condition that the first-step frequency relay is operated and the second-step frequency relay is not operated and then when both of the first-step and second-step frequency relays are operated; the detection of the islanding operation being executed without amplifying the magnitude of the very small deviation when both of the first-step and second-step frequency relays are operated.

13. An apparatus as claimed in claim 11, wherein the frequency relay section detects the islanding operation of the generator when each time the deviation amount of the frequency is greater than the settling value is summed and its sum becomes greater than a predetermined time.

14. An apparatus as claimed in claim 13, wherein the detection of the islanding operation due to an acceleration of the generator by a short-circuit accident of the system which is not interconnected with the generator is prevented by being in a timed relation with a short-circuit removing relay of the system.

15. An apparatus as claimed in claim 12, wherein the frequency relay section executes a lock of the output signal of the frequency relay by the operation of a short-circuit accident detection relay, and preventing the detection of the islanding operation with respect to and acceleration of the dispersed generator in an short-circuit accident of the system not interconnected with the dispersed generator.

16. An apparatus as claimed in claim 11, wherein a condition of the dispersed generator is detected by an open-and-close signal of the circuit breaker, the disturbance signal generating section outputting the deviation signal to the automatic voltage regulator only when the dispersed generator is interconnected with the electric power system.

17. An apparatus as claimed in claim 11, wherein the frequency relay monitors a deviation amount of a reactive power of the dispersed generator and detecting an abnormality of the disturbance signal generating section.

18. An apparatus as claimed in claim 17, wherein a system interconnected condition of the dispersed generator is detected by an open-and-close signal of the system interconnecting circuit breaker, the abnormality of the disturbance signal generating section being detected only when the dispersed generator is interconnected with the electric power system to prevent a wrong detection of the abnormality of the disturbance signal generating section due to the decrease of the deviation amount of the reactive power of the generator due to the deviation of the voltage set value of the dispersed generator.

* * * * *

UNITED STATES PATENT AND TRADEMARK OFFICE
CERTIFICATE OF CORRECTION

PATENT NO. : 5,808,449
DATED : September 15, 1998
INVENTOR(S) : Yoshiyuki HIRAYAMA et al.

It is certified that error appears in the above-identified patent and that said Letters Patent is hereby corrected as shown below:

On the title page,
Item [30] Foreign Application Priority Data contains a typographical error wherein "Feb. 6, 1995 [JP] Japan 8-019572" should read --Feb. 6, 1996 [JP] Japan 8-019572--.

Signed and Sealed this

Eleventh Day of May, 1999

Attest:

Attesting Officer

Q. TODD DICKINSON

Acting Commissioner of Patents and Trademarks